US011464001B2

(12) United States Patent
Fakoorian et al.

(10) Patent No.: US 11,464,001 B2
(45) Date of Patent: Oct. 4, 2022

(54) JOINT ACTIVATION OF MULTIPLE SEMI-PERSISTENT SCHEDULING CONFIGURATIONS IN A SINGLE MESSAGE

(71) Applicant: QUALCOMM Incorporated, San Diego, CA (US)

(72) Inventors: Seyed Ali Akbar Fakoorian, San Diego, CA (US); Xiaoxia Zhang, San Diego, CA (US); Aleksandar Damnjanovic, Del Mar, CA (US); Jing Sun, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 166 days.

(21) Appl. No.: 16/942,475

(22) Filed: Jul. 29, 2020

(65) Prior Publication Data

US 2021/0051634 A1 Feb. 18, 2021

Related U.S. Application Data

(60) Provisional application No. 62/888,098, filed on Aug. 16, 2019.

(51) Int. Cl.
*H04W 72/04* (2009.01)
*H04L 1/18* (2006.01)

(52) U.S. Cl.
CPC ......... *H04W 72/042* (2013.01); *H04L 1/1812* (2013.01); *H04W 72/0413* (2013.01); *H04W 72/0446* (2013.01)

(58) Field of Classification Search
CPC ........... H04W 72/042; H04W 72/0413; H04W 72/0446; H04W 72/1289; H04L 1/1812;
(Continued)

(56) References Cited

U.S. PATENT DOCUMENTS

2019/0174530 A1* 6/2019 Kim ..................... H04L 1/0003
2019/0254053 A1 8/2019 Ying et al.
(Continued)

OTHER PUBLICATIONS

International Search Report and Written Opinion—PCT/US2020/044175—ISA/EPO—dated Nov. 12, 2020.
(Continued)

*Primary Examiner* — Dady Chery
(74) *Attorney, Agent, or Firm* — Terry Tsai

(57) ABSTRACT

This disclosure provides systems, methods, and apparatuses for jointly activating or releasing a plurality of semi-persistent scheduling (SPS) configurations using a single downlink control information (DCI) message. In some implementations, a user equipment (UE) receiving the DCI message can determine, for each SPS configuration, a number of time slots between an end of the received DCI message and a beginning of one or more downlink (DL) data frames based on a first value contained in the DCI message. The UE can also determine, for each SPS configuration, a number of time slots between an end of the DL data frames and an instance in time at which the UE is to transmit a hybrid automatic repeat request acknowledgement (HARQ-ACK) based on a second value contained in the DCI message. In some instances, the single DCI message can also jointly activate or release a plurality of configured grant (CG) configurations.

28 Claims, 13 Drawing Sheets

(58) Field of Classification Search
CPC ... H04L 1/1822; H04L 1/1864; H04L 1/1887; H04L 1/1854
See application file for complete search history.

(56) References Cited

U.S. PATENT DOCUMENTS

2020/0313809 A1* 10/2020 Park .............. H04L 1/1861
2021/0021382 A1*  1/2021 Chien ............ H04L 1/1861

OTHER PUBLICATIONS

Zte: "Enhancements for DL SPS Configurations," 3GPP Draft, 3GPP TSG RAN WG1 #97, R1-1906416, Enhancements for DL SPS Configurations, 3rd Generationpartnership Project (3GPP), Mobilecompetence Centre, vol. RAN WG1. No. Reno, USA; May 13, 2019-May 17, 2019, May 13, 2019 (May 13, 2019), XP051727866, 5 pages, Retrieved from the Internet: URL:http://www.3gpp.org/ftp/Meetings%5F3GPP%6FSYNC/RAN1/Docs/R1%2D1906416%2Ezip, [retrieved on May 13, 2019], Section 2.3.

* cited by examiner

US 11,464,001 B2

JOINT ACTIVATION OF MULTIPLE SEMI-PERSISTENT SCHEDULING CONFIGURATIONS IN A SINGLE MESSAGE

CROSS-REFERENCE TO RELATED APPLICATIONS

This patent application claims priority to U.S. Provisional Patent Application No. 62/888,098 entitled "JOINT ACTIVATION OF MULTIPLE SEMI-PERSISTENT SCHEDULING CONFIGURATIONS IN A SINGLE MESSAGE" and filed on Aug. 16, 2019, which is assigned to the assignee hereof. The disclosures of all prior applications are considered part of and are incorporated by reference in this patent application.

TECHNICAL FIELD

The present disclosure relates generally to wireless communication systems, and more particularly, to joint activation and/or release for multiple configured grant configurations and/or multiple semi-persistent scheduling configurations.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). There exists a need for further improvements in 5G NR technology.

SUMMARY

The systems, methods and devices of this disclosure each have several innovative aspects, no single one of which is solely responsible for the desirable attributes disclosed herein.

One innovative aspect of the subject matter described in this disclosure can be implemented as a method for wireless communication. In some implementations, the method may be performed by a user equipment (UE), and may include receiving a single downlink control information (DCI) message identifying a plurality of semi-persistent scheduling (SPS) configurations to be jointly activated or released; determining, for each SPS configuration of the plurality of SPS configurations, a number of time slots between an end of the received DCI message and a beginning of one or more downlink (DL) data frames based on a first value carried in the DCI message; and determining, for each SPS configuration of the plurality of SPS configurations, a number of time slots between an end of the one or more DL data frames and an instance in time at which the UE is to transmit a hybrid automatic repeat request acknowledgement (HARQ-ACK) based on a second value carried in the DCI message. In some instances, the DCI message may also indicate at least one of a frequency domain resource assignment (FDRA), a time domain resource assignment (TDRA), or a modulation and coding scheme (MCS) common to each SPS configuration of the plurality of SPS configurations.

The first and second values may be configured by a radio resource controller (RRC). In some instances, the end of the received DCI message corresponds to an end of a physical downlink control channel (PDCCH) reception occasion, and the beginning of the one or more DL data frames corresponds to a start of a physical downlink shared channel (PDSCH) reception occasion. In other instances, the end of the one or more DL data frames corresponds to the end of the PDSCH reception occasion, and the determined instance in time corresponds to a start of a physical uplink control channel (PUCCH) resource. In addition, or in the alternative, the DCI message may also indicate an activation or release of a plurality of configured grant configurations, and may include at least one of a frequency domain resource assignment (FDRA), a time domain resource assignment (TDRA), or a modulation and coding scheme (MCS) that is common to each configured grant configuration of the plurality of configured grant configurations.

In some implementations, the method may also include determining a time difference between the end of the PDSCH reception occasion and the start of the PUCCH resource, multiplexing the HARQ-ACKs corresponding to the plurality of SPS configurations with one or more codebooks based on the time difference being less than a value, and transmitting the multiplexed HARQ-ACKs and codebooks on the PUCCH resource, concurrently. The method may also include transmitting the HARQ-ACKs corresponding to the plurality of SPS configurations on the PUCCH at the determined instances in time based on the time difference being greater than or equal to the value.

In other implementations, the method may also include determining a time difference between the end of the PDSCH reception occasion and the start of the PUCCH resource, and refraining from transmitting the HARQ-ACKs on the PUCCH resource based on the time difference being less than the value. The second value may be based on a PDSCH-to-HARQ feedback timer, and may be associated with the end of the PDSCH reception occasion of the corresponding SPS configuration. In some instances, the second value may indicate different PUCCH transmission occasions for at least two SPS configurations of the plurality of SPS configurations. In other instances, the second value may indicate a same PUCCH transmission occasion for each SPS configuration of the plurality of SPS configurations. In some other instances, the second value may identify a slot or subframe in a PUCCH resource for transmission of the HARQ-ACK from each SPS configuration of the plurality of SPS configurations.

In some implementations, the method may also include receiving the one or more DL data frames associated with at least one SPS configuration of the plurality of SPS configurations, and transmitting the HARQ-ACK for the at least one SPS configuration of the plurality of SPS configurations on a physical uplink control channel (PUCCH) at the determined instance in time.

Another innovative aspect of the subject matter described in this disclosure can be implemented in a wireless communication device. In some implementations, the wireless communication device includes at least one modem, at least one processor communicatively coupled with the at least one modem, and at least one memory communicatively coupled with the at least one processor. The at least one memory may store instructions that, when executed by the at least one processor in conjunction with the at least one modem, causes the wireless communication device to perform operations that include receiving a single downlink control information (DCI) message identifying a plurality of semi-persistent scheduling (SPS) configurations to be jointly activated or released; determining, for each SPS configuration of the plurality of SPS configurations, a number of time slots between an end of the received DCI message and a beginning of one or more downlink (DL) data frames based on a first value carried in the DCI message; and determining, for each SPS configuration of the plurality of SPS configurations, a number of time slots between an end of the one or more DL data frames and an instance in time at which the UE is to transmit a hybrid automatic repeat request acknowledgement (HARQ-ACK) based on a second value carried in the DCI message. In some instances, the DCI message may also indicate at least one of a frequency domain resource assignment (FDRA), a time domain resource assignment (TDRA), or a modulation and coding scheme (MCS) common to each SPS configuration of the plurality of SPS configurations.

The first and second values may be configured by a radio resource controller (RRC). In some instances, the end of the received DCI message corresponds to an end of a physical downlink control channel (PDCCH) reception occasion, and the beginning of the one or more DL data frames corresponds to a start of a physical downlink shared channel (PDSCH) reception occasion. In other instances, the end of the one or more DL data frames corresponds to the end of the PDSCH reception occasion, and the determined instance in time corresponds to a start of a physical uplink control channel (PUCCH) resource. In addition, or in the alternative, the DCI message may also indicate an activation or release of a plurality of configured grant configurations, and may include at least one of a frequency domain resource assignment (FDRA), a time domain resource assignment (TDRA), or a modulation and coding scheme (MCS) that is common to each configured grant configuration of the plurality of configured grant configurations.

In some implementations, the operations may also include determining a time difference between the end of the PDSCH reception occasion and the start of the PUCCH resource, multiplexing the HARQ-ACKs corresponding to the plurality of SPS configurations with one or more codebooks based on the time difference being less than a value, and transmitting the multiplexed HARQ-ACKs and codebooks on the PUCCH resource, concurrently. The operations may also include transmitting the HARQ-ACKs corresponding to the plurality of SPS configurations on the PUCCH at the determined instances in time based on the time difference being greater than or equal to the value.

In other implementations, the operations may also include determining a time difference between the end of the PDSCH reception occasion and the start of the PUCCH resource, and refraining from transmitting the HARQ-ACKs on the PUCCH resource based on the time difference being less than the value. The second value may be based on a PDSCH-to-HARQ feedback timer, and may be associated with the end of the PDSCH reception occasion of the corresponding SPS configuration. In some instances, the second value may indicate different PUCCH transmission occasions for at least two SPS configurations of the plurality of SPS configurations. In other instances, the second value may indicate a same PUCCH transmission occasion for each SPS configuration of the plurality of SPS configurations. In some other instances, the second value may identify a slot or subframe in a PUCCH resource for transmission of the HARQ-ACK from each SPS configuration of the plurality of SPS configurations.

In some implementations, the operations may also include receiving the one or more DL data frames associated with at least one SPS configuration of the plurality of SPS configurations, and transmitting the HARQ-ACK for the at least one SPS configuration of the plurality of SPS configurations on a physical uplink control channel (PUCCH) at the determined instance in time.

DETAILED DESCRIPTION

Figure 1:
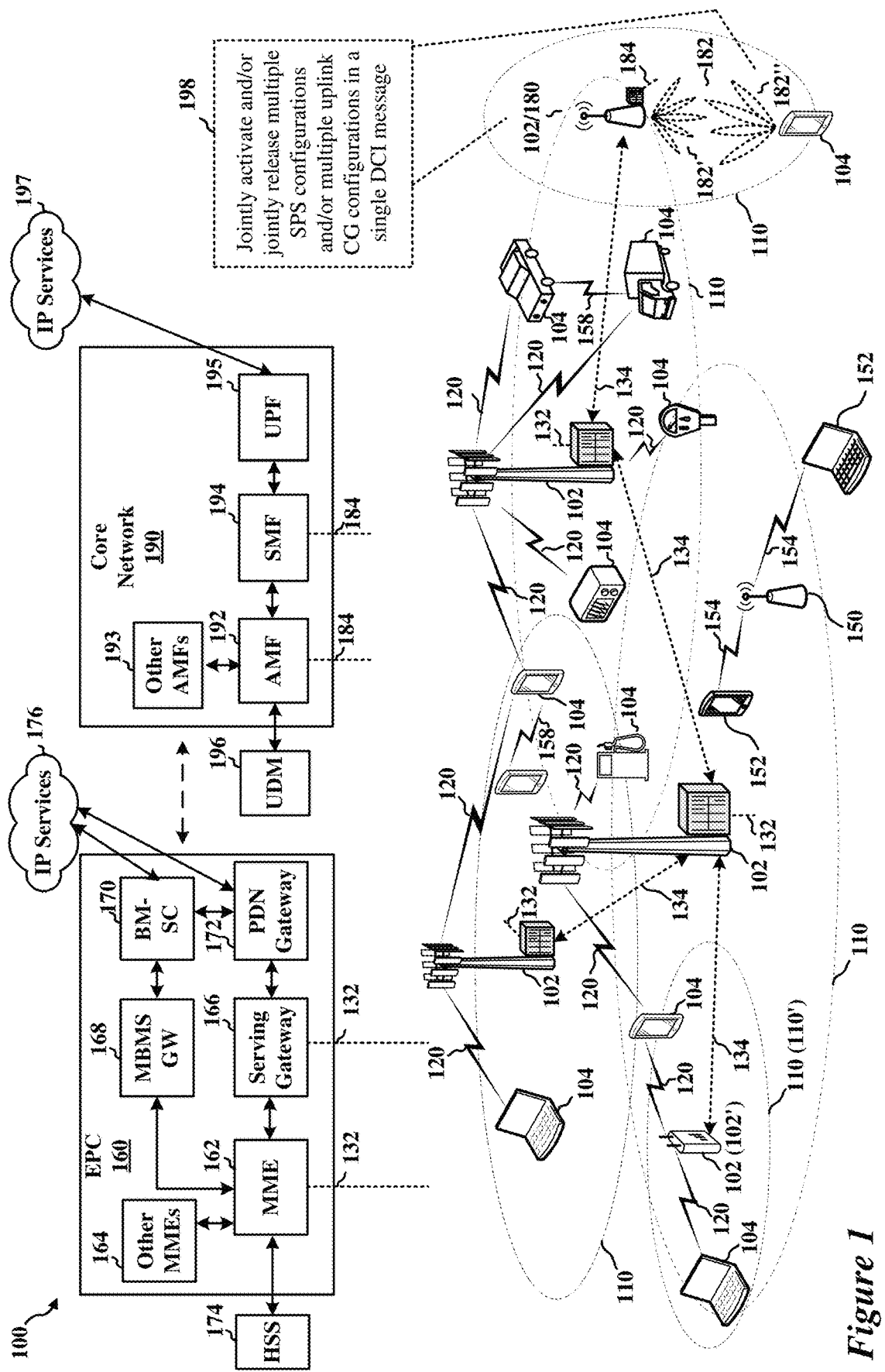
FIG. 1 shows a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 shows a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in some implementations, the base station 102/180 may be configured to jointly activate (and/or to jointly release) multiple semi-persistent scheduling (SPS) configurations and/or multiple uplink configured grant configurations in a single DCI message, and the UE 104 may be configured to decode the DCI message to identify the activated SPS configurations and/or the activated uplink configured grant configurations (198). The UE 104 may also be configured to determine timing information for each of the activated SPS configurations based at least in part on information carried by the single DCI message (198).

Figure 2:
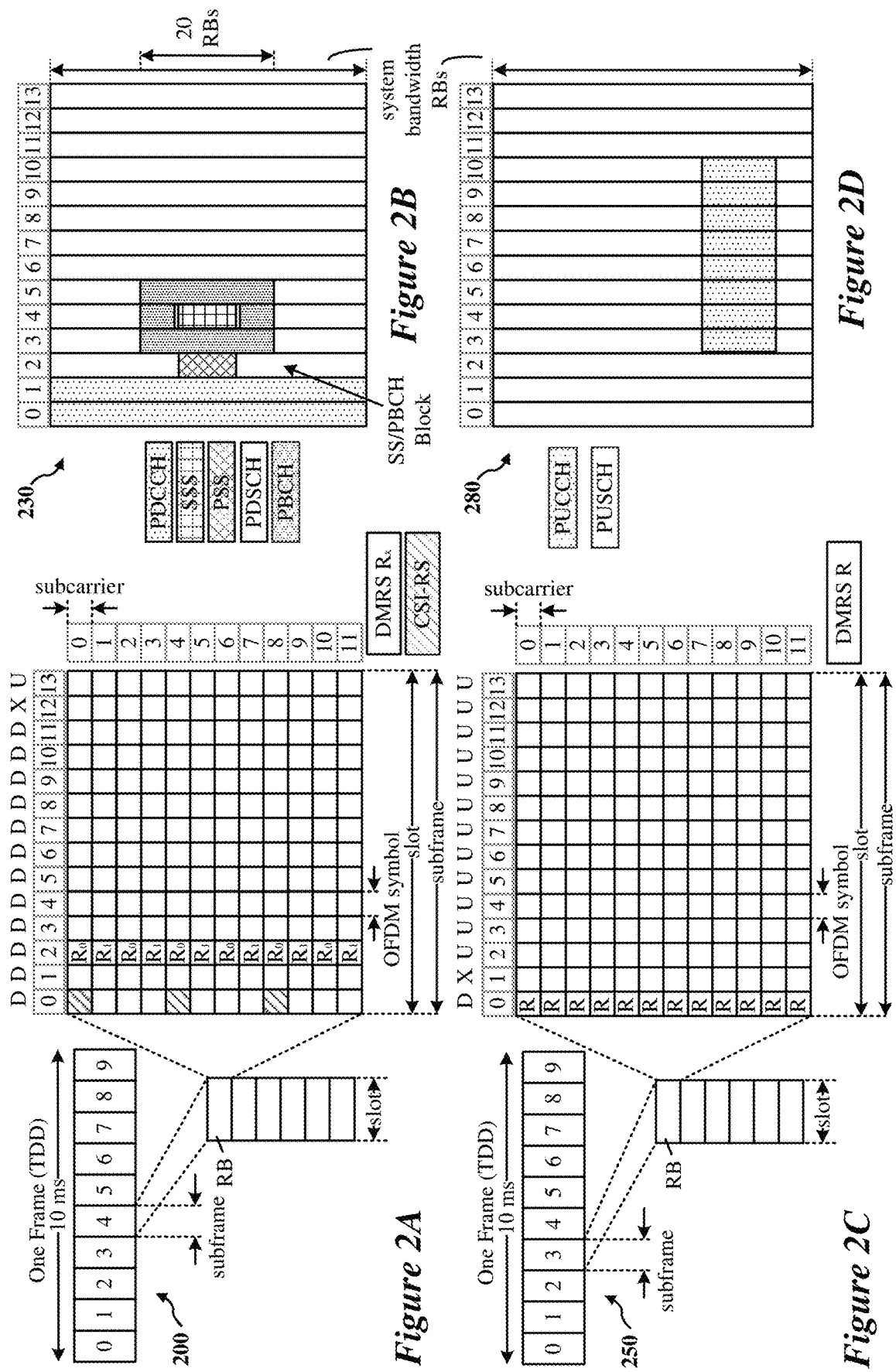
FIGS. 2A, 2B, 2C, and 2D show diagrams illustrating examples of a first 5G/NR frame, DL channels within a 5G/NR subframe, a second 5G/NR frame, and UL channels within a 5G/NR subframe, respectively.

FIG. 2A shows a diagram 200 illustrating an example of a first subframe within a 5G/NR frame structure. FIG. 2B shows a diagram 230 illustrating an example of DL channels within a 5G/NR subframe. FIG. 2C shows a diagram 250 illustrating an example of a second subframe within a 5G/NR frame structure. FIG. 2D shows a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kKz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
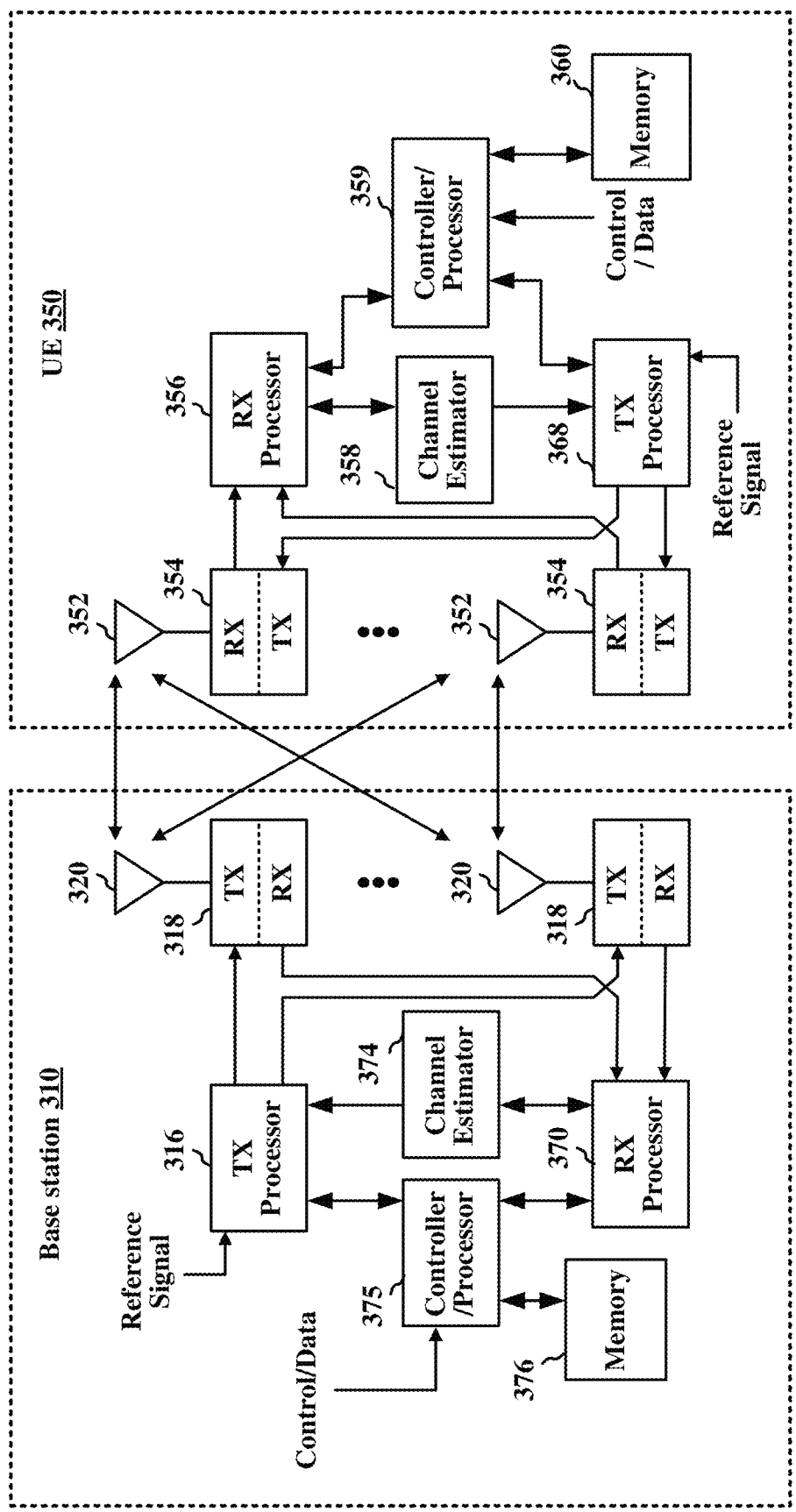
FIG. 3 shows a diagram illustrating an example of a base station and user equipment (UE) in an access network.

FIG. 3 shows a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Semi-persistent scheduling (SPS) enables radio resources to be semi-statically configured and allocated to a UE for a longer time period than one subframe, which may avoid the need for specific downlink assignment messages and/or uplink grant messages over a physical downlink control channel (PDCCH) for each subframe. To configure SPS resources, radio resource control (RRC) signaling may indicate an interval at with which the radio resources are periodically assigned, and PDCCH signaling may indicate specific transmission resource allocations in the time/frequency domain and various transmission attributes of the SPS resources (such as periodicity, modulation and control scheme (MCS), time offset, transmit power, and/or the like). Hybrid automatic repeat request (HARQ) processes may be used to acknowledge reception of UL data and DL data transmitted on SPS resources. More specifically, a non-adaptive synchronous HARQ process may be used for UL data transmissions, thereby allowing a UE to retransmit data using the same resources and the same MCS that was used for the original or previous UL data transmission. For DL transmissions, an adaptive asynchronous HARQ process may be used, with the MCS indicated on the PDCCH.

To support different service types (such as URLLC, eMBB, MMTC, and so on) that may have different requirements with respect to reliability, latency, data rates, and communication range, NR UL defines two types of UL data transmissions that may be performed without a grant from the base station, generally referred to as a configured grant (CG). For example, a Type 1 CG configuration allows a UE to perform UL data transmission without a grant based at least in part on RRC configuration without any PDCCH signaling, and a Type 2 CG configuration allows the UE to perform UL data transmission without a grant based at least in part on RRC configuration in combination with PDCCH signaling that activates and/or releases the Type 2 CG configuration.

Downlink SPS resources and Type 2 uplink configured grant resources are configured by the RRC, and may be activated and released using downlink control information (DCI) messages transmitted on the PDCCH. For example, the RRC may periodically transmit DCI messages to activate downlink SPS configurations and/or Type 2 uplink configured grant configurations, which remain active for a duration. When a UE receives a DCI that activates a downlink SPS configuration, the UE may receive DL data from the base station on the PDSCH according to the activated downlink SPS configuration. Similarly, when the UE receives a DCI that activates an uplink configured grant configuration, the UE may transmit UL data on the PUSCH according to the activated uplink configured grant configuration.

The DCI message that activates a single SPS configuration typically indicates the resource assignments and timing information for the SPS configuration, and the CS-RNTI, the periodicity, the number of HARQ processes, the PUCCH resources, and the MCS for the SPS configuration are typically indicated to the UE via RRC configuration. More specifically, the DCI message typically includes a frequency domain resource assignment (FDRA), a time domain resource assignment (FDRA), and a PDSCH-to-HARQ feedback timer for the single SPS configuration. The DCI message may also include an RRC configured table containing up to 16 entries, with each entry including an SLIV value and a K0 value. The SLIV value may indicate the starting symbol and length of the PDSCH, and the K0 value may indicate the number of slots between an end of the PDCCH reception and a beginning of the PDSCH reception (e.g., the time period between the instance at which the UE received the last symbol of the DCI message on the PDCCH and the instance at which the UE is to begin receiving DL data on the PDSCH). The PDSCH-to-HARQ feedback timer may be used to determine a K1 value that indicates the number of slots between the end of the PDSCH and a beginning of the PUCCH upon which the HARQ-ACK is transmitted (e.g., the time period between the instance at which the UE received the last symbol of the DL data on the PDSCH and the instance at which the UE is to begin transmitting HARQ feedback information on the PUCCH).

In some implementations, a UE may be provided with multiple downlink SPS configurations and/or multiple Type 2 uplink configurations for a given bandwidth part (BWP) of a serving cell. For example, a given UE may be associated with up to sixteen (16) different downlink SPS configurations and up to twelve (12) different Type 2 uplink CG configurations. In current approaches, different downlink SPS configurations and different Type 2 uplink CG configurations are activated and released individually, which requires the base station to send a separate DCI message for each SPS configuration and Type 2 uplink CG configuration to be activated. In other words, to activate a number N of SPS configurations, the base station needs to send the same number N of DCI messages to a UE, and to release a number N of SPS configurations, the base station needs to send the same number N of DCI messages to the UE. Similarly, to activate a number N of Type 2 uplink CG configurations, the base station needs to send the same number N of DCI messages to the UE, and to release a number N of Type 2 uplink CG configurations, the base station needs to send the same number N of DCI messages to the UE. As such, the current approach of having separate activations and separate releases for different SPS configurations and different Type 2 uplink CG configurations increases network overhead and consumes substantial resources at the base station and the UE because the base station has to prepare and transmit multiple DCI messages, the network has to transport the multiple DCI messages, and the UE has to receive and decode the multiple DCI messages.

Aspects of the present disclosure may allow a single DCI message to jointly activate and/or jointly release multiple downlink SPS configurations and multiple Type 2 uplink CG configurations. In some implementations, different SPS and/or CG configurations associated with a UE may be divided or otherwise grouped into different sets, and a bit sequence in a single DCI message can be used to indicate multiple SPS configurations and/or multiple CG configurations that are to be jointly activated and/or released. In some aspects, the bit sequence may include a codepoint that indicates an index associated with a particular SPS configuration and/or CG configuration to be activated or released, and all SPS configurations and/or CG configurations that are members of the set that includes the particular SPS configuration and/or CG configuration may be jointly activated and/or released by the single DCI message. Additionally, or alternatively, the bit sequence may include a bitmap in which each individual bit corresponds to a particular set, which can be used to indicate multiple sets that are to be jointly activated and/or released. Different configurations may be associated with different sets, and an individual configuration may be activated and/or released based at least in part on whether the bitmap indicates that all sets including the individual configuration are to be activated or released.

By jointly activating and/or jointly releasing multiple downlink SPS configurations and multiple uplink CG configurations using a single DCI message, various aspects of the present disclosure may conserve network resources, base station resources, and UE resources relative to current approaches that use multiple DCI messages to separately activate and/or release the multiple downlink SPS configurations and multiple uplink CG configurations. In some implementations, the length of the bit sequence in the single DCI message may be constrained to be less than or equal to a length of a DCI field used for separate activation and/or release, for example, to avoid incurring additional overhead by ensuring that the joint activation and/or joint release of multiple SPS configurations or multiple uplink CG configurations do not increase the size of the DCI message. In some aspects, an existing DCI field (e.g., a HARQ process number) may be used to indicate which configurations are to be activated and/or released, thereby avoiding a need to introduce a new DCI field to indicate which configurations are to be activated and/or released.

In some implementations, the CS-RNTI may be associated with multiple downlink SPS configurations and/or multiple uplink CG configurations. The CS-RNTI generally corresponds to a unique identification for the UE that is used to manage resources associated with downlink SPS configurations and uplink CG configurations. In some aspects, the RRC may define a periodicity of a downlink SPS configuration, and a PDCCH addressed to the CS-RNTI can activate and/or release the downlink SPS configuration. Similarly, the RRC may define a periodicity of an uplink CG configuration, and a PDCCH addressed to a CS-RNTI can be used as a signal to either activate or release the uplink CG configuration.

In other implementations, different configuration sets can be associated with different CS-RNTIs, and the SPS configurations and/or uplink CG configurations that are jointly activated or released may be constrained to those configurations that are associated with the same CS-RNTI. For example, in some aspects, the UE may be associated with multiple CS-RNTIs, and each CS-RNTI may correspond to a particular configuration set that contains one or more multiple configurations that can be jointly activated or released. In this manner, with multiple different CS-RNTIs, the bit sequence in the DCI that is used to jointly activate or release uplink CG configurations, downlink SPS configurations, and/or the like may be reduced, thus achieving greater reliability.

Implementations of the subject matter disclosed herein may also allow the same DCI message that jointly activates multiple downlink SPS configurations and/or multiple Type 2 uplink CG configurations to indicate at least some of the transmission parameters for the activated downlink SPS configurations and/or uplink CG configurations, without increasing the size or length of the DCI message. In accordance with some aspects of the present disclosure, when a single DCI message activates a plurality of different SPS configurations, the K0 and K1 values for the SPS configurations may be RRC configured and provided to a UE via DCI messages. In some implementations, the UE may apply the K1 value to all SPS configurations activated by a DCI message, for example, such that the instance in time at which the UE is to transmit HARQ feedback information for each SPS configuration is based on the time at which the UE received the last symbol of DL data associated with the corresponding SPS configuration. For such implementations, the UE may transmit HARQ feedback information for each activated SPS configuration at different times using different PUCCH resources, for example, as discussed with respect to FIG. 5.

In other implementations, the UE may apply the K1 value to a selected SPS configuration of the activated SPS configurations to determine the instance in time at which the UE is to transmit HARQ feedback information for the selected SPS configuration, and may transmit HARQ feedback information for the other (non-selected) SPS configurations at the same determined instance in time. For such implementations, the UE may transmit HARQ feedback information for each activated SPS configuration at the same time using the same PUCCH resources, for example, as discussed with respect to FIG. 6.

By providing at least some transmission parameters for downlink SPS configurations and/or uplink CG configurations in the same DCI message that jointly activates and/or jointly releases the downlink SPS configurations and/or uplink CG configurations, various aspects of the present disclosure may conserve network resources, base station resources, and UE resources, for example, as compared to alternate solutions that may separately transmit a set of transmission parameters for each of the jointly activated downlink SPS configurations and/or uplink CG configurations. In some implementations, the K0 and K1 values may be carried in an existing field (e.g., a HARQ process number) of the DCI message, thereby avoiding a need to introduce a new DCI field that would increase the size or length of the DCI message.

Figure 4:
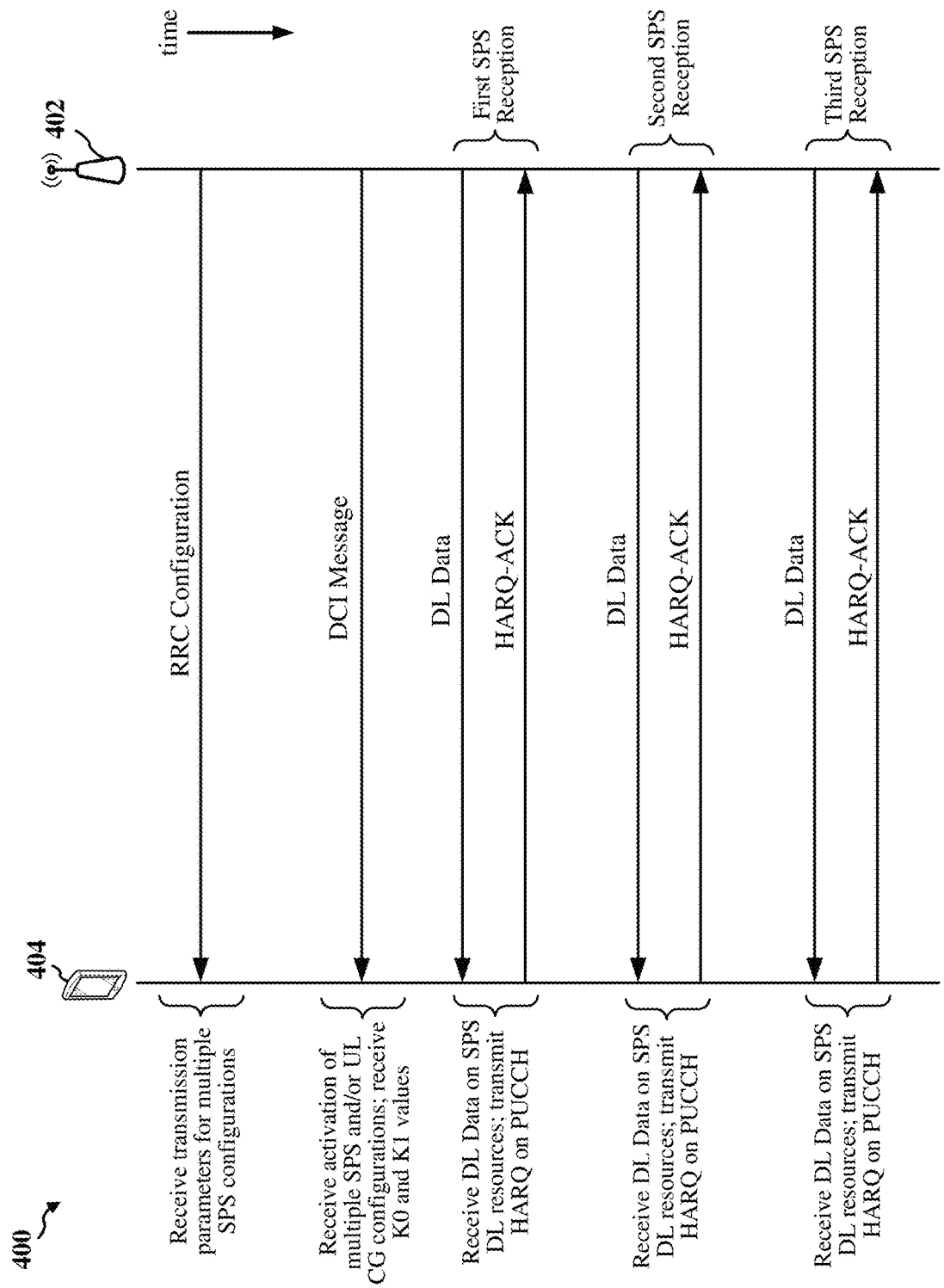
FIG. 4 shows a sequence diagram depicting an example message exchange between a base station and UE in an access network.

FIG. 4 shows a sequence diagram depicting an example message exchange 400 between a base station 402 and a UE 404 in an access network. The base station 402, which may be one implementation of the base station 102 of FIG. 1, may include an RRC that defines and configures multiple downlink SPS configurations and multiple Type 2 uplink CG configurations. The UE 404, which may be one example of the UE 104 of FIG. 1, may be associated with multiple downlink SPS configurations and/or with multiple Type 2 uplink CG configurations, for example, so that the UE 404 can support different service or traffic types. In some instances, different SPS configurations may be used for different service types (e.g., URLLC, eMMB, MMTC, and so on). In other instances, different SPS configurations may be used for different traffic types (e.g., VoIP data, V2X data, and so on).

As shown, the base station 402 may provide an RRC configuration that identifies multiple SPS configurations and/or multiple uplink CG configurations that can be associated with the UE 404. In some implementations, the RRC configuration may also indicate the MCS for each of the multiple SPS configurations and/or each of the multiple uplink CG configurations. In addition, or in the alternative, the RRC configuration may indicate the FDRA and TDRA information for each of the multiple SPS configurations and/or each of the multiple uplink CG configurations. In other implementations, the RRC configuration may define two types of SPS configurations: a Type 1 SPS configuration that does not use PDCCH signaling for activation, and a Type 2 SPS configuration that is activated using PDCCH signaling. The Type 1 SPS configuration may be similar to the Type 1 uplink CG configuration in that activation by a DCI message is not necessary for the UE 404 to use the SPS resources, and the Type 2 SPS configuration may be similar to the Type 2 uplink CG configuration in that activation by a DCI message is needed for the UE 404 to use the SPS resources.

Thereafter, the base station 402 may periodically transmit a DCI message that jointly activates multiple SPS configurations and/or multiple uplink CG configurations. In some implementations, the DCI message may include at least the K0 and K1 values for the activated SPS configurations. In some other implementations, the DCI message may include the FDRA and the TDRA for the activated SPS configurations. In some aspects, the DCI message may contain FDRA information, TDRA information, and K0 and K1 values that are common to all of the activated SPS configurations. In other implementations, the DCI message may not include FDRA or TDRA information, for example, when such information is provided to the UE 404 via RRC configuration. In addition, or in the alternative, the RRC configuration may indicate a different K0 and/or K1 value for each of the different SPS configurations, in which case the DCI message may not include any K0 value.

Although not shown for simplicity, the UE 404 may transmit a message (to the base station 402) that jointly acknowledges all SPS configurations and/or uplink CG configurations that were activated and/or released by the DCI message 501. For example, in the case of an SPS configuration that is activated or released, the UE 404 may acknowledge the activation or release by transmitting the acknowledgement in a codebook through a PUCCH resource, and in the case of a CG configuration that is activated or released, the UE may acknowledge the activation or release by transmitting the acknowledgement through a medium access control (MAC) control element (MAC-CE).

The UE 404 may receive the DCI message, and decode information carried in the DCI message to identify the activated SPS configurations and/or the activated UL CG configurations. In some implementations, the UE 404 may use values carried in the DCI message (such as K0 and K1 values) to determine timing information for receiving DL data on the PDSCH and for transmitting HARQ feedback information (e.g., ACKs and NACKs) on the PUCCH for each of the activated SPS configurations.

Once the SPS configurations are activated, the UE 404 may receive DL data on the PDSCH for one or more of the activated SPS configurations during a first SPS reception. For each of the one or more SPS configurations, the UE 404 may determine whether all of the transmitted DL data was received and correctly decoded, and then transmit HARQ feedback information to the base station 402 on the PUCCH. The HARQ feedback information may include ACKs to acknowledge portions of the DL data that were received and correctly decoded, and/or may include NACKs to indicate portions of the DL data that were not received or not correctly decoded.

Thereafter, the base station 402 may transmit additional DL data on the PDSCH for each of the SPS configurations during one or more subsequent SPS receptions, and the UE 404 may transmit HARQ feedback information to the base station 402 on the PUCCH for each of the one or more subsequent SPS receptions. Although the example of FIG. 4 is shown to include three SPS receptions, in other implementations, the DCI message may jointly activate the multiple SPS configurations (and multiple uplink CG configurations) for any suitable number of receptions or occurrences.

Figure 5:
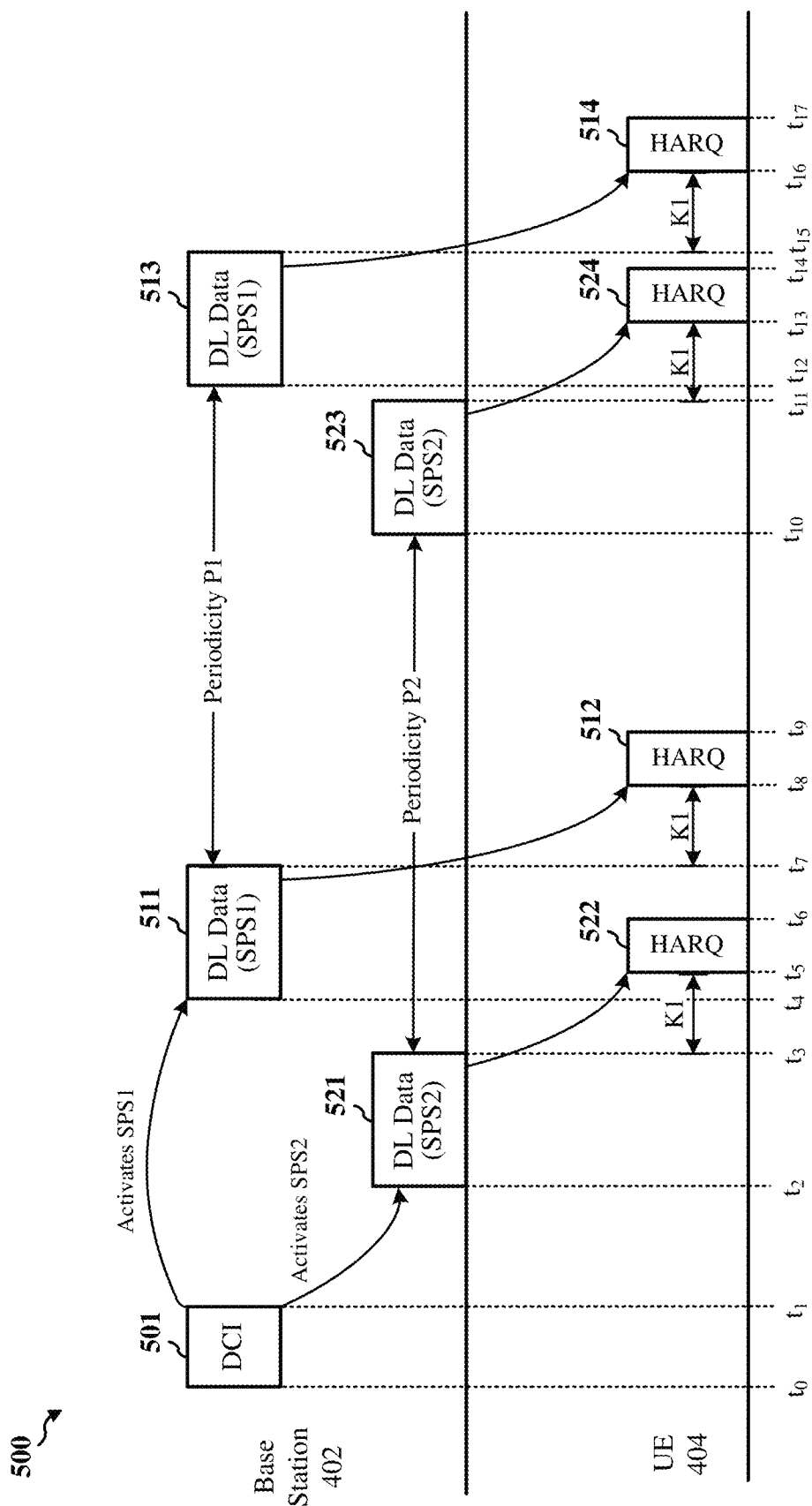
FIG. 5 shows a timing diagram depicting an example message exchange between a base station and UE, according to some implementations.

FIG. 5 shows a timing diagram depicting an example message exchange 500 between the base station 402 and the UE 404, according to some implementations. Prior to time $t_0$, the base station 402 may provide an RRC configuration that identifies multiple SPS configurations and/or multiple uplink CG configurations and indicates the MCS for each of the SPS configurations and/or uplink CG configurations. In some implementations, the RRC configuration may include separate FDRA and TDRA information for each of the different SPS configurations. In addition, or in the alternative, the RRC configuration may include unique K0 and K1 values for each of the different SPS configurations. In some other implementations, the RRC configuration may define a Type 1 SPS configuration that does not use PDCCH signaling for activation, and may define a Type 2 SPS configuration that is activated using PDCCH signaling.

At time $t_0$, the base station 402 transmits a DCI message 501 that jointly activates a first SPS configuration (SPS1) and a second SPS configuration (SPS2). In other implementations, the DCI message 501 may jointly activate other suitable numbers of SPS configurations and/or uplink CG configurations. In some implementations, the DCI message 501 may include at least the K0 and K1 values for the activated SPS configurations. In some other implementations, the DCI message 501 may include the FDRA and the TDRA for the activated SPS configurations. In some aspects, the DCI message 501 may contain FDRA information, TDRA information, and K0 and K1 values that are common to all of the activated SPS configurations. In other implementations, the DCI message 501 may not include FDRA or TDRA information, for example, when such information is provided to the UE 404 via RRC configuration. In addition, or in the alternative, the RRC configuration may indicate a different K0 and/or K1 value for each of the different SPS configurations, in which case the DCI message 501 may not include any K0 value.

In some other implementations, the DCI message 501 may indicate a common cg-DMRS-Configuration for multiple activated uplink CG configurations, for example, if the activated uplink CG configurations do not overlap in time; otherwise, if the activated uplink CG configurations overlap in time or are not common to all of the activated uplink CG configurations, the cg-DMRS-Configuration for each of the different uplink CG configurations may be indicated by the RRC configuration.

The UE 404 may receive the DCI message 501 at time $t_1$, and may decode information carried by the DCI message 501 to identify the activated first and second SPS configurations (and the activated UL CG configurations, if any). The UE 404 may use the indicated K0 and K1 values to determine timing information for receiving DL data on the PDSCH and for transmitting HARQ information on the PUCCH for each of the first and second SPS configurations.

More specifically, for the first SPS configuration, the UE 404 may use the K0 value to determine the number of slots between the end of the received DCI message 501 (at time $t_1$) and the beginning of one or more DL data frames 511 to be received on the PDSCH (at time $t_4$). The end of the received DCI message 501 corresponds to an end of the PDCCH reception occasion, and the beginning of the one or more DL data frames 511 corresponds to the start of a PDSCH reception occasion for the first SPS configuration. The UE 404 may use the K1 value to determine the number of slots between the end of the one or more DL data frames 511 (at time $t_7$) and an instance in time at which the UE 404 is to transmit a HARQ feedback information (at time $t_8$) for first SPS configuration. The end of the one or more DL data frames 511 corresponds to the end of the PDSCH reception occasion for the first SPS configuration, and the determined instance in time corresponds to the start of the PUCCH resource upon which the HARQ feedback information is to be transmitted for the first SPS configuration. In this manner, the K1 value may identify a slot or subframe in the PUCCH resource for transmission of HARQ feedback information for the first SPS configuration.

For the second SPS configuration, the UE 404 may use the K0 value to determine the number of slots between the end of the received DCI message 501 (at time $t_1$) and the beginning of one or more DL data frames 521 to be received on the PDSCH (at time $t_2$). The end of the received DCI message 501 corresponds to the end of the PDCCH reception occasion, and the beginning of the one or more DL data frames 521 corresponds to the start of the PDSCH reception occasion for the second SPS configuration. The UE 404 may use the K1 value to determine the number of slots between the end of the one or more DL data frames 521 (at time $t_3$) and an instance in time at which the UE 404 is to transmit HARQ feedback information (at time $t_5$) for the second SPS configuration. The end of the one or more DL data frames 521 corresponds to an end of the PDSCH reception occasion for the second SPS configuration, and the determined instance in time corresponds to a start of the PUCCH resource upon which the HARQ feedback information is to be transmitted for the second SPS configuration. In this manner, the K1 value may identify a slot or subframe in the PUCCH resource for transmission of HARQ feedback information for the second SPS configuration.

At time $t_2$, the UE 404 begins receiving DL data 521 associated with the second SPS configuration on the PDSCH, and receives the last symbol of the DL data 521 at time $t_3$. The UE 404 may determine whether all of the transmitted DL data 521 was received and correctly decoded, and may transmit corresponding HARQ feedback information 522 on the PUCCH at time $t_5$.

At time $t_4$, the UE 404 begins receiving DL data 511 associated with the first SPS configuration on the PDSCH, and receives the last symbol of the DL data 511 at time $t_7$. The UE 404 may determine whether all of the transmitted DL data 511 was received and correctly decoded, and may transmit corresponding HARQ feedback information 512 on the PUCCH at time $t_8$.

At time $t_{10}$, the UE 404 begins receiving additional DL data 523 associated with the second SPS configuration on the PDSCH (e.g., during a second SPS reception), and receives the last symbol of the DL data 523 at time $t_{11}$. The UE 404 may determine whether all of the transmitted DL data 523 was received and correctly decoded, and may transmit corresponding HARQ feedback information 524 on the PUCCH at time $t_{13}$.

At time $t_{12}$, the UE 404 begins receiving additional DL data 513 associated with the first SPS configuration on the PDSCH (e.g., during a second SPS reception), and receives the last symbol of the DL data 513 at time $t_{15}$. The UE 404 may determine whether all of the transmitted DL data 513 was received and correctly decoded, and may transmit corresponding HARQ feedback information 514 on the PUCCH at time $t_{16}$.

It is noted that because the UE 404 uses the same value of K1 to determine when to transmit HARQ feedback information for each of the first and second SPS configurations, the time period between receiving a last symbol of each DL data transmission and transmitting corresponding HARQ feedback information is the same for both the first and second SPS configurations. Moreover, for the example of FIG. 5, the first SPS configuration has a first periodicity of P1, and the second SPS configuration has a second periodicity of P2, where the first periodicity P1 is shorter than the second periodicity P2. Because the first and second SPS configurations have different periodicities, the timing offset between DL data receptions for the first and second SPS configurations may change (e.g., drift) for each SPS reception occurrence. Further, because the UE 404 uses the same value of K1 to determine when to transmit HARQ feedback information on the PUCCH for each of the first and second SPS configurations, the timing offset between DL data reception for the first SPS configuration and transmission of HARQ feedback information for the second SPS configuration may also change (e.g., drift) for each SPS reception occurrence.

Although the example of FIG. 5 includes two SPS receptions, in other implementations, the DCI message may jointly activate the first and second SPS configurations for any suitable number of receptions or occurrences. Further, although the DCI message 501 is shown in FIG. 5 as jointly activating two SPS configurations, in other implementations, the DCI message 501 may jointly activate any suitable number of SPS configurations and/or uplink CG configurations.

Figure 6:
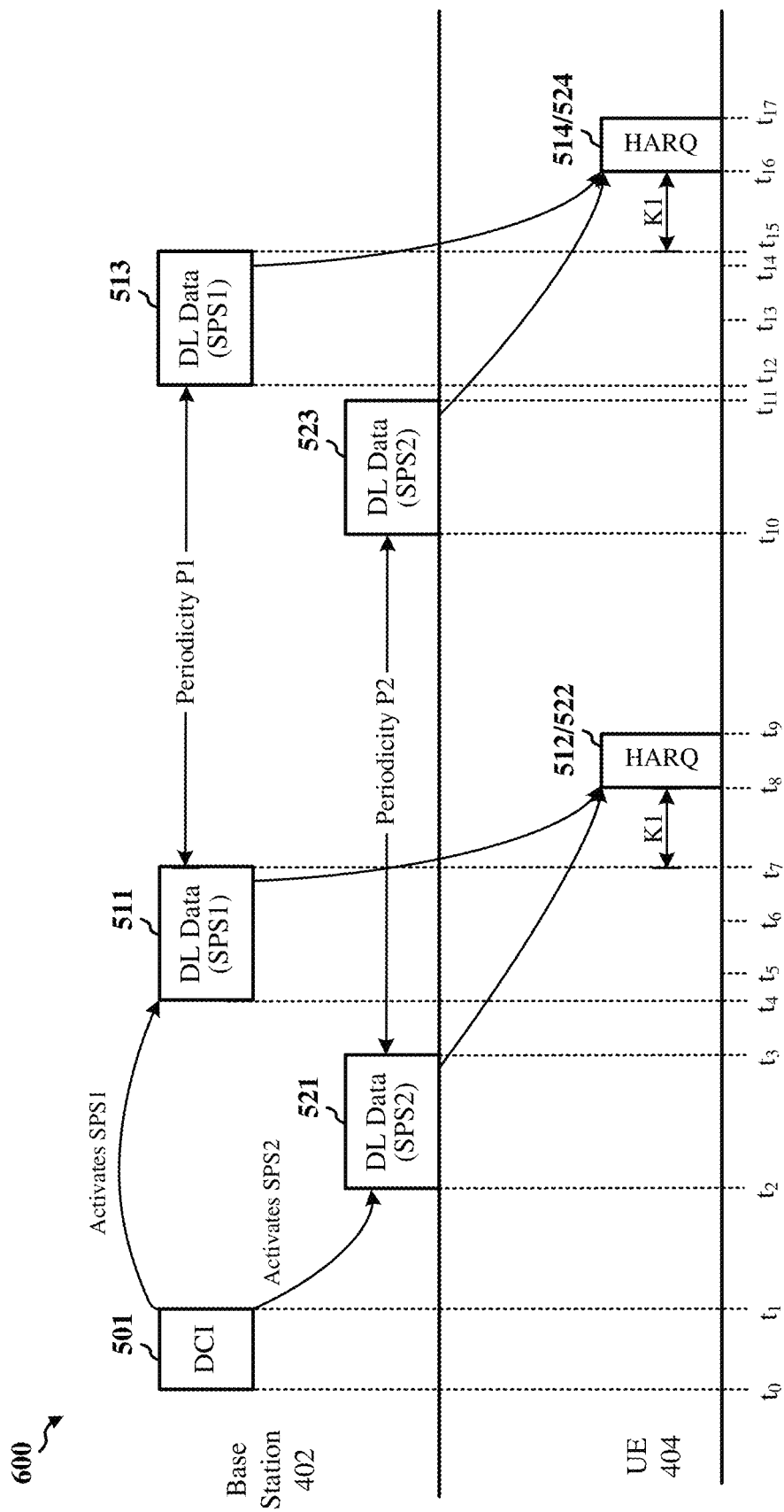
FIG. 6 shows a timing diagram depicting another example message exchange between a base station and UE, according to other implementations.

FIG. 6 shows a timing diagram depicting an example message exchange 600 between the base station 402 and the UE 404, according to other implementations. The message exchange 600 of FIG. 6 is similar to the message exchange 500 of FIG. 5, except that the UE 404 uses the K1 value indicated in the DCI message 501 to determine the instance in time at which the UE 404 is to transmit HARQ feedback information for the first SPS configuration, and aligns the transmission of HARQ feedback information for the second SPS configuration (and for all other activated SPS configurations, not shown for simplicity) with determined instance in time at which the UE is to transmit HARQ feedback information for the first SPS configuration. In this manner, the K1 value indicated in the DCI message 501 may identify a slot or subframe in the PUCCH resource for concurrent transmission of HARQ feedback information for the first and second SPS configurations.

Because the transmission of HARQ feedback information for each of the first and second SPS configurations is based on the end of each PDSCH reception occasion for the first SPS configuration, the UE 404 transmits HARQ feedback information for the first SPS configuration at times $t_8$ and $t_{16}$, and also transmits HARQ feedback information for the second SPS configuration at times $t_8$ and $t_{16}$. More specifically, the UE 404 transmits HARQ feedback information 512 for the first SPS configuration concurrently with the transmission of HARQ feedback information 522 for the second SPS configuration at the determined instance in time corresponding to time $t_8$, and transmits HARQ feedback information 514 for the first SPS configuration concurrently with the transmission of HARQ feedback information 524 for the second SPS configuration at the determined instance in time corresponding to time $t_{16}$. The UE 404 may transmit the HARQ feedback information 512 and 522 using the same PUCCH resources, and may transmit the HARQ feedback information 514 and 524 using the same PUCCH resources.

In some implementations, the UE 404 may multiplex the ACK-NACKs corresponding to HARQ feedback information 512 and 522 into the codebook carried by the PUCCH resource of the first SPS configuration, and then transmit the HARQ-ACK multiplexed codebook on the PUCCH resource at time $t_8$. Similarly, the UE 404 may multiplex the ACK-NACKs corresponding to HARQ feedback information 514 and 524 into the codebook carried by the PUCCH resource of the first SPS configuration, and then transmit the HARQ-ACK multiplexed codebook on the PUCCH resource at time $t_{16}$. In some aspects, the UE 404 may multiplex the ACK-NACKs corresponding to HARQ feedback information into the codebook carried by the PUCCH resource of the first SPS configuration only if the PUCCH resource occurs at least N1 symbols after reception of DL data corresponding to the second SPS configuration. For example, the UE 404 may multiplex the ACK-NACKs for HARQs 512 and 522 into the codebook carried by the PUCCH resource of SPS1 only if time $t_8$ occurs at least N1 symbols after time $t_3$, and the UE 404 may multiplex the ACK-NACKs for HARQs 514 and 524 into the codebook carried by the PUCCH resource of SPS1 only if time $t_{16}$ occurs at least N1 symbols after time $t_{11}$.

For the example of FIG. 6, selection of the first SPS configuration as a reference from which to determine transmit times for HARQ feedback information for all activated SPS configurations is based on the first SPS configuration having the shortest periodicity. In other implementations, the SPS configuration having the longest periodicity may be selected as the reference from which to determine transmit times for HARQ feedback information for all activated SPS configurations. In some other implementations, a first or a last SPS configuration in a group of SPS configurations may be selected as the reference from which to determine transmit times for HARQ feedback information for all activated SPS configurations.

Figure 7:
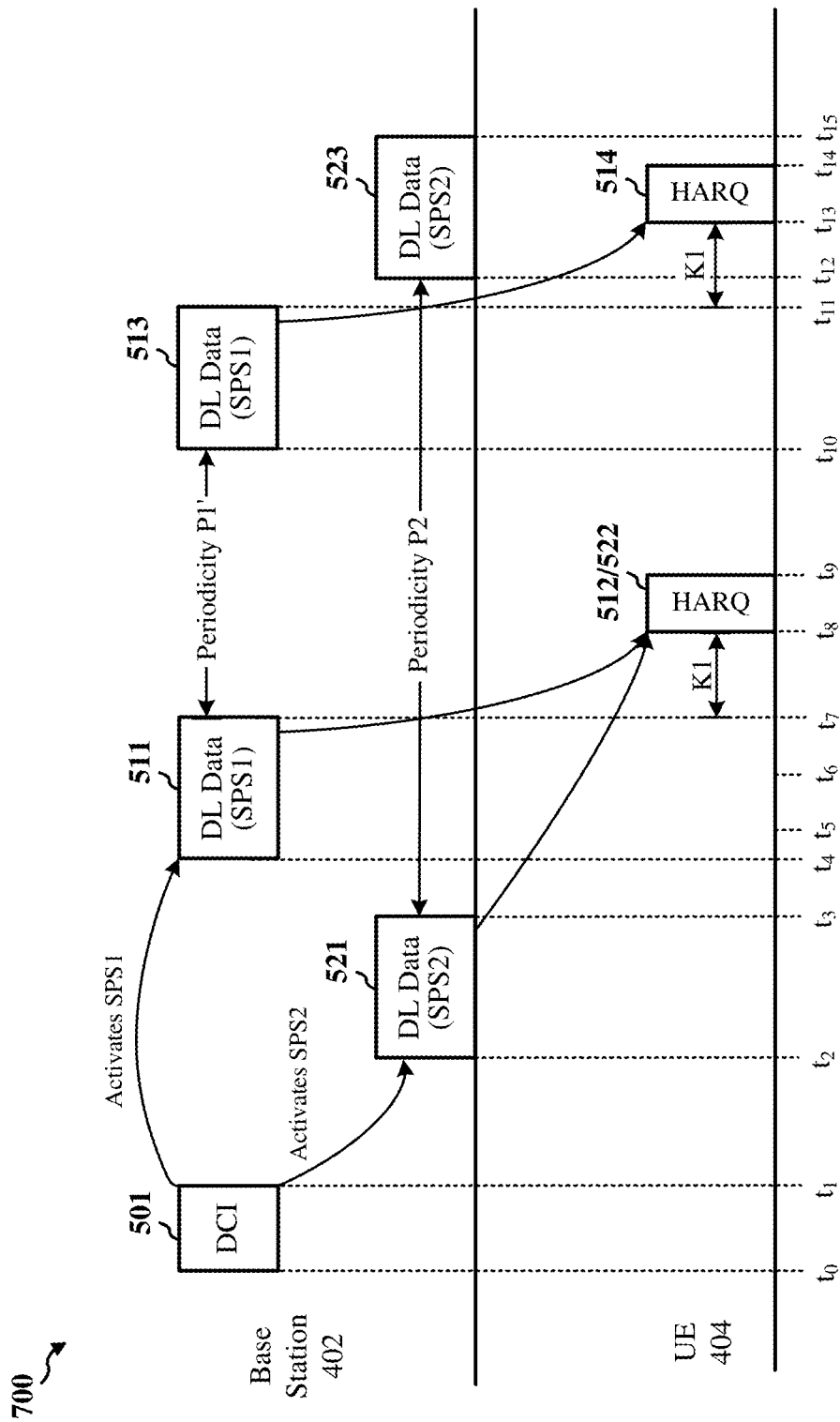
FIG. 7 shows a timing diagram depicting an example message exchange between a base station and UE in an access network.

FIG. 7 shows a timing diagram depicting another example message exchange 700 between the base station 402 and the UE 404, according to some other implementations. The message exchange 700 of FIG. 7 is similar to the message exchange 600 of FIG. 6, except that the first SPS configuration of FIG. 7 has a periodicity P1' that is less than the periodicity P1 of the first SPS configuration of FIG. 6, and therefore much less than the periodicity P2 of the second SPS configuration. Similar to the message exchange 600 of FIG. 6, the times at which the UE 404 is to transmit HARQ feedback information for the second SPS configuration are referenced from the end of DL data receptions for the first SPS configuration. Due to the relative periodicities P1' and P2 of the first and second SPS configurations, respectively, the UE 404 begins receiving the additional DL data 513 for the first SPS configuration at time $t_{10}$, and begins receiving the additional DL data 523 for the second SPS configuration at time $t_{12}$. However, the time at which the UE 404 is to transmit HARQ feedback information for reception of the DL data 513 and 523 occurs at time $t_{13}$, which is before the UE 404 receives the last symbol of the DL data 523 for the second SPS configuration, at time $t_{15}$. As a result, the UE 404 is not able to transmit HARQ feedback information for reception of the DL data 523 at time $t_{13}$ (e.g., because not all of the DL data 523 has been received).

In accordance with some aspects of the present disclosure, the UE 404 may determine a time difference between an end of the PDSCH reception and the start of the PUCCH resource upon which the HARQ feedback information is to be transmitted, and may compare the determined time difference with a value to determine whether the UE 404 has enough time to decode the DL data and then construct the HARQ ACK/NACK before the instance in time at which the UE is to transmit HARQ feedback information to the base station 402. In some implementations, the UE 404 may refrain from transmitting the HARQ feedback information based on the determined time difference being less than the value. In other implementations, the UE 404 may multiplex the HARQ feedback information for the first and second SPS configurations with one or more codebooks, and then transmit the multiplexed HARQ feedback information and codebooks on the PUCCH resource.

For the example of FIG. 7, the end of the PDSCH reception (which corresponds to the time at which the UE 404 receives the last symbol of the additional DL data 523) occurs at time $t_{15}$, and the start of the PUCCH resource upon which the corresponding HARQ feedback information is to be transmitted occurs at time $t_{13}$, thereby resulting in a negative time difference. In this case, the UE 404 may refrain from transmitting HARQ feedback information for reception of the additional DL data 523.

Figure 8:
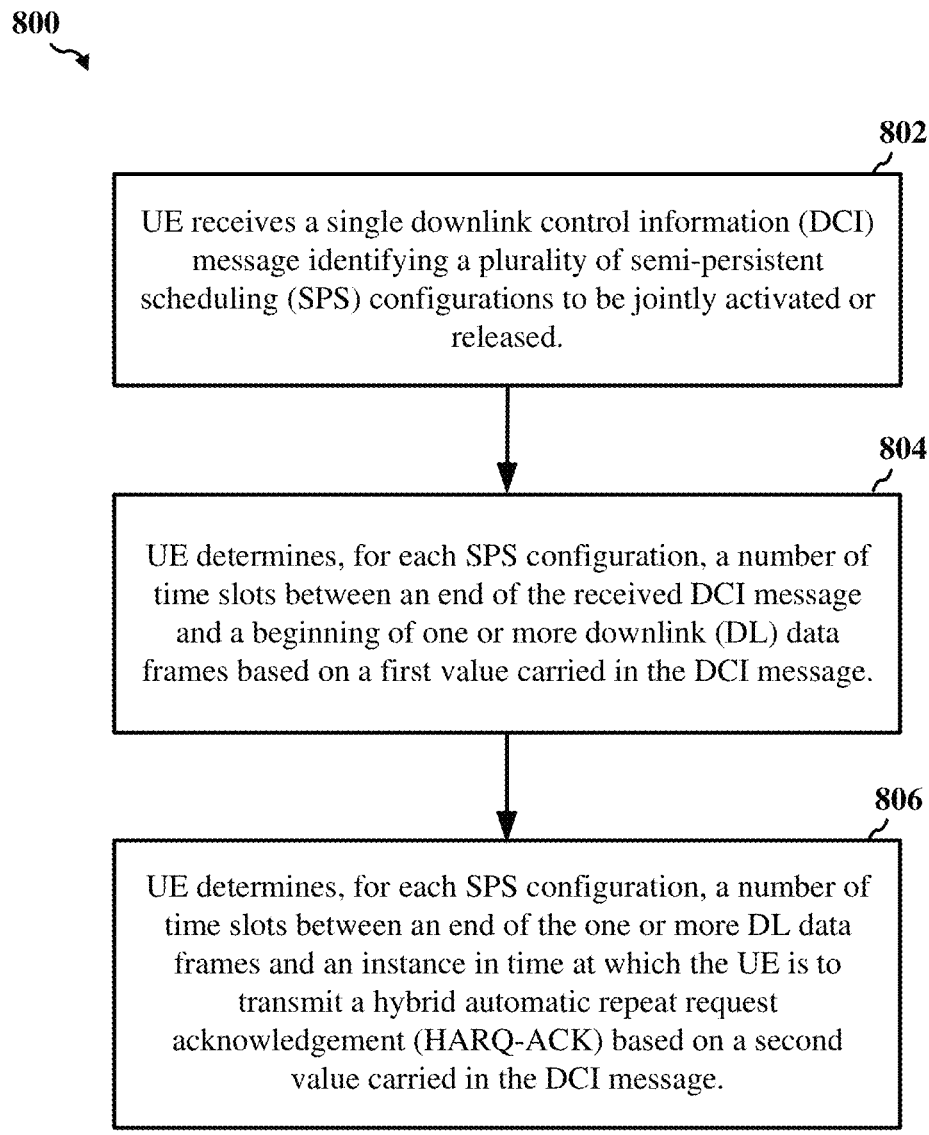
FIG. 8 shows a flowchart of an example method of wireless communication.

FIG. 8 shows a flowchart of an example method 800 of wireless communication. The method 800 may be performed by a UE (e.g., the UE 104 of FIG. 1, the UE 404 of FIGS. 5-7, or the apparatus 1202/1202' of FIG. 12). Although described with respect to the UE 404 of FIG. 5, the method 800 may be performed by any suitable UE.

At block 802, the UE 404 receives a single DCI message identifying a plurality of SPS configurations to be jointly activated or released. For example, the UE 404 may receive the DCI message 501 that jointly activates the first and second SPS configurations (SPS1 and SPS2). In some implementations, the DCI message 501 may include at least the K0 and K1 values for the activated SPS configurations. In some other implementations, the DCI message 501 may include the FDRA and the TDRA for the activated SPS configurations. In some aspects, the DCI message 501 may contain FDRA information, TDRA information, and K0 and K1 values that are common to all of the activated SPS configurations. In other implementations, the DCI message 501 may not include FDRA or TDRA information, for example, when such information is provided to the UE 404 via RRC configuration. In addition, or in the alternative, the RRC configuration may indicate a different K0 and/or K1 value for each of the different SPS configurations, in which case the DCI message 501 may not include any K0 value.

In some other implementations, the DCI message 501 may indicate a common cg-DMRS-Configuration for multiple activated uplink CG configurations, for example, if the activated uplink CG configurations do not overlap in time; otherwise, if the activated uplink CG configurations overlap in time or are not common to all of the activated uplink CG configurations, the cg-DMRS-Configuration for each of the different uplink CG configurations may be indicated by the RRC configuration.

At block 804, the UE determines, for each SPS configuration, a number of slots between an end of the received DCI message and a beginning of one or more DL data frames based on a first value carried in the DCI message. For one example, the UE 404 may, for the first SPS configuration, use the K0 value to determine the number of slots between the end of the received DCI message 501 (at time $t_1$) and the beginning of one or more DL data frames 511 to be received on the PDSCH (at time $t_4$). For another example, the UE 404 may, for the second SPS configuration, use the K0 value to determine the number of slots between the end of the received DCI message 501 (at time $t_1$) and the beginning of one or more DL data frames 521 to be received on the PDSCH (at time $t_2$).

At block 806, the UE 404 determines, for each SPS configuration, a number of slots between an end of the one or more DL data frames and an instance in time at which the UE 404 is to transmit HARQ-ACK based on a second value carried in the DCI message. For one example, the UE 404 may use the K1 value to determine the number of slots between the end of the one or more DL data frames 511 (at time $t_7$) and an instance in time at which the UE 404 is to transmit a HARQ feedback information (at time $t_8$) for first SPS configuration. For another example, the UE 404 may use the K1 value to determine the number of slots between the end of the one or more DL data frames 521 (at time $t_3$) and an instance in time at which the UE 404 is to transmit HARQ feedback information (at time $t_5$) for the second SPS configuration.

Figure 9:
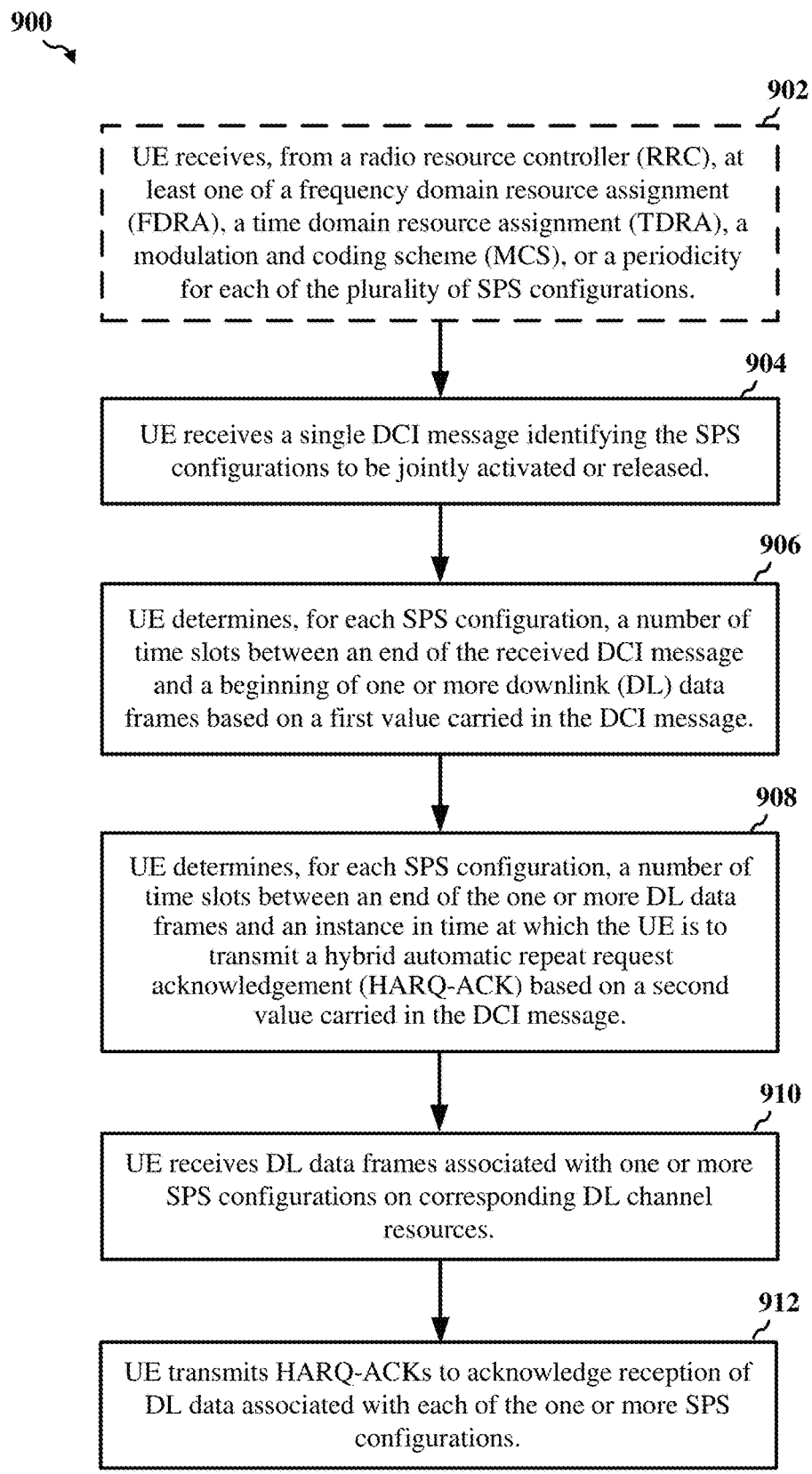
FIG. 9 shows a flowchart of another example method of wireless communication.

FIG. 9 shows a flowchart of an example method 900 of wireless communication. The method 900 may be performed by a UE (e.g., the UE 104 of FIG. 1, the UE 404 of FIGS. 5-7, or the apparatus 1202/1202' of FIG. 12). Although described with respect to the UE 404 of FIG. 5, the method 900 may be performed by any suitable UE.

At block 902, the UE may optionally receive, from a radio resource controller (RRC), at least one of a frequency domain resource assignment (FDRA), a time domain resource assignment (TDRA), a modulation and coding scheme (MCS), or a periodicity for each of a plurality of SPS configurations. For example, prior to time $t_0$, the base station 402 may provide an RRC configuration that identifies multiple SPS configurations and/or multiple uplink CG configurations, that indicates the MCS for each of the SPS configurations and/or uplink CG configurations, and/or that includes the FDRA and TDRA information for each of the different SPS configurations.

At block 904, the UE receives a single DCI message identifying the plurality of SPS configurations to be jointly activated or released. For example, the UE 404 may receive the DCI message 501 that jointly activates the first and second SPS configurations (SPS1 and SPS2). In some implementations, the DCI message 501 may include at least the K0 and K1 values for the activated SPS configurations. In some other implementations, the DCI message 501 may include the FDRA and the TDRA for the activated SPS configurations. In some aspects, the DCI message 501 may contain FDRA information, TDRA information, and K0 and K1 values that are common to all of the activated SPS configurations. In other implementations, the DCI message 501 may not include FDRA or TDRA information, for example, when such information is provided to the UE 404 via RRC configuration. In addition, or in the alternative, the RRC configuration may indicate a different K0 and/or K1 value for each of the different SPS configurations, in which case the DCI message 501 may not include any K0 value.

At block 906, the UE determines, for each SPS configuration, a number of slots between an end of the received DCI message and a beginning of one or more DL data frames based on a first value carried in the DCI message. For one example, the UE 404 may use the K0 value to determine the number of slots between the end of the received DCI message 501 (at time $t_1$) and the beginning of one or more DL data frames 511 to be received on the PDSCH (at time $t_4$) for the first SPS configuration. For another example, the UE 404 may use the K0 value to determine the number of slots between the end of the received DCI message 501 (at time $t_1$) and the beginning of one or more DL data frames 521 to be received on the PDSCH (at time $t_2$) for the second SPS configuration.

At block 908, the UE determines, for each of the plurality of SPS configurations, a number of slots between an end of the one or more DL data frames and an instance in time at which the UE 404 is to transmit a HARQ-ACK based on a second value carried in the DCI message. For one example, the UE 404 may use the K1 value to determine the number of slots between the end of the one or more DL data frames 511 (at time $t_7$) and an instance in time at which the UE 404 is to transmit a HARQ feedback information (at time $t_8$) for first SPS configuration. For another example, the UE 404 may use the K1 value to determine the number of slots between the end of the one or more DL data frames 521 (at time $t_3$) and an instance in time at which the UE 404 is to transmit HARQ feedback information (at time $t_5$) for the second SPS configuration.

At block 910, the UE receives DL data frames associated with one or more SPS configurations on corresponding DL channel resources. For one example, at time $t_2$, the UE 404 begins receiving DL data 521 associated with the second SPS configuration on the PDSCH, and at time $t_4$, the UE 404 begins receiving DL data 511 associated with the first SPS configuration on the PDSCH. For another example, at time $t_{10}$, the UE 404 begins receiving DL data 523 associated with the second SPS configuration on the PDSCH, and at time $t_{12}$, the UE 404 begins receiving DL data 513 associated with the first SPS configuration on the PDSCH.

At block 912, the UE transmits HARQ-ACKs to acknowledge reception of the DL data associated with each of the one or more SPS configurations. For one example, the UE 404 may transmit HARQ feedback information 522 on the PUCCH at time $t_5$ to acknowledge reception of the DL data 521, and may transmit HARQ feedback information 512 on the PUCCH at time $t_8$ to acknowledge reception of the DL data 511. For another example, the UE 404 may transmit HARQ feedback information 524 on the PUCCH at time $t_{13}$ to acknowledge reception of the DL data 523, and may transmit HARQ feedback information 514 on the PUCCH at time $t_{16}$ to acknowledge reception of the DL data 513.

Figure 10:
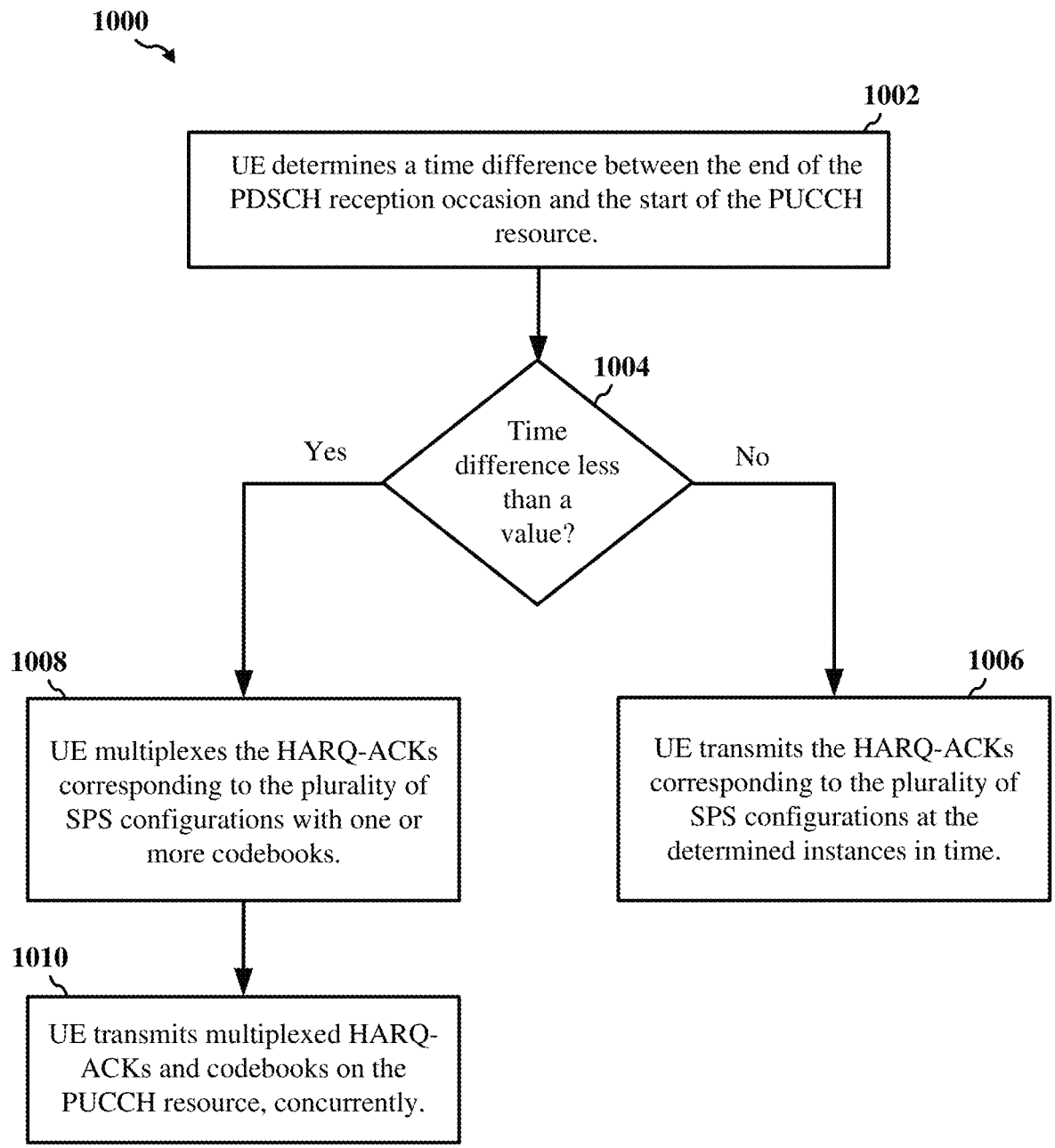
FIG. 10 shows a flowchart of another example method of wireless communication.

FIG. 10 shows a flowchart of an example method 1000 of wireless communication. The method 1000 may be performed by a UE (e.g., the UE 104 of FIG. 1, the UE 404 of FIGS. 5-7, or the apparatus 1202/1202' of FIG. 12). Although described with respect to the UE 404 of FIG. 7, the method 1000 may be performed by any suitable UE. In some implementations, the method 1000 may begin after the UE 404 determines a number of slots between the end of the one or more DL data frames and the instance in time at which the UE 404 is to transmit HARQ-ACK at 806 of FIG. 8.

At block 1002, the UE determines a time difference between the end of the PDSCH reception occasion and the start of the PUCCH resource. For example, the UE 404 may determine a time difference between an end of the PDSCH reception and the start of the PUCCH resource upon which the HARQ feedback information is to be transmitted, and may compare the determined time difference with a value to determine whether the UE 404 has enough time to decode the DL data and then construct the HARQ ACK/NACK before the instance in time at which the UE is to transmit HARQ feedback information to the base station 402.

If the time difference is greater than (or equal to) a value, as determined at block 1004, then at block 1006 the UE transmits the HARQ-ACKs corresponding to the plurality of SPS configurations on the PUCCH at the determined instances in time. Conversely, if the time difference is less than the value, as determined at block 1004, then at block 1008 the UE 404 multiplexes the HARQ-ACKs corresponding to the plurality of SPS configurations with one or more codebooks. For the example of FIG. 7, the end of the PDSCH reception (which corresponds to the time at which the UE 404 receives the last symbol of the additional DL data 523) occurs at time $t_{15}$, and the start of the PUCCH resource upon which the corresponding HARQ feedback information is to be transmitted occurs at time $t_{13}$, thereby resulting in a negative time difference. At block 1010, the UE transmits the multiplexed HARQ-ACKs and codebooks on the PUCCH resource, concurrently.

Figure 11:
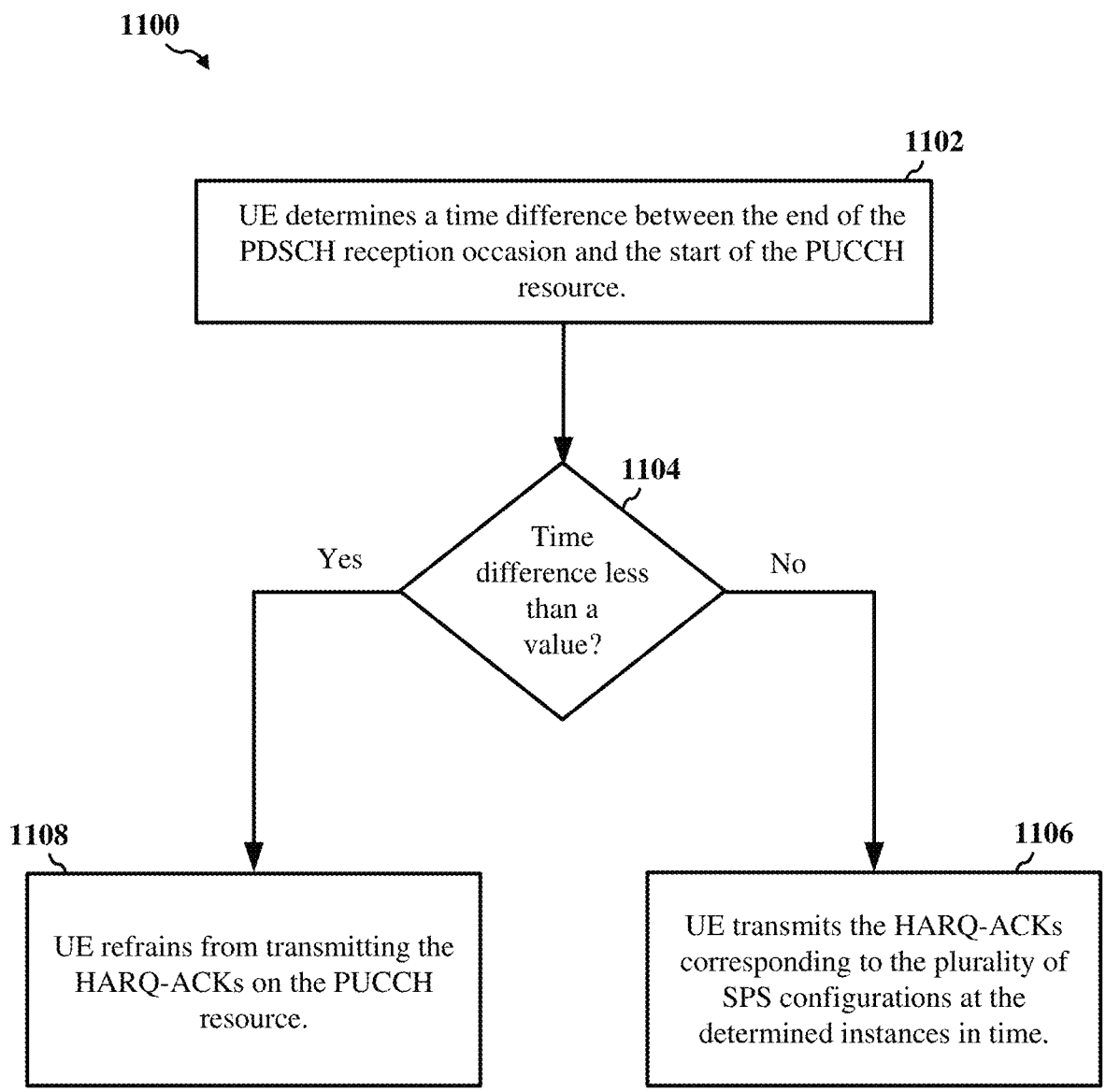
FIG. 11 shows a flowchart of another example method of wireless communication.

FIG. 11 shows a flowchart of an example method 1100 of wireless communication. The method 1100 may be performed by a UE (e.g., the UE 104 of FIG. 1, the UE 404 of FIGS. 5-7, or the apparatus 1202/1202' of FIG. 12). Although described with respect to the UE 404 of FIG. 7, the method 1100 may be performed by any suitable UE. In some implementations, the method 1100 may begin after the UE 404 determines a number of slots between the end of the one or more DL data frames and an instance in time at which the UE 404 is to transmit HARQ-ACK at 806 of FIG. 8.

At block 1102, the UE determines a time difference between the end of the PDSCH reception occasion and the start of the PUCCH resource. For example, the UE 404 may determine a time difference between an end of the PDSCH reception and the start of the PUCCH resource upon which the HARQ feedback information is to be transmitted, and may compare the determined time difference with a value to determine whether the UE 404 has enough time to decode the DL data and then construct the HARQ ACK/NACK before the instance in time at which the UE is to transmit HARQ feedback information to the base station 402.

If the time difference is greater than (or equal to) a value, as determined at block 1104, then at block 1106 the UE transmits the HARQ-ACKs corresponding to the plurality of SPS configurations on the PUCCH at the determined instances in time. Conversely, if the time difference is less than the value, as determined at block 1104, then at block 1108 the UE refrains from transmitting the HARQ-ACKs on the PUCCH resource. For the example of FIG. 7, the end of the PDSCH reception (which corresponds to the time at which the UE 404 receives the last symbol of the additional DL data 523) occurs at time $t_{15}$, and the start of the PUCCH resource upon which the corresponding HARQ feedback information is to be transmitted occurs at time $t_{13}$, thereby resulting in a negative time difference. In this case, the UE 404 may refrain from transmitting HARQ feedback information for reception of the additional DL data 523.

Figure 12:
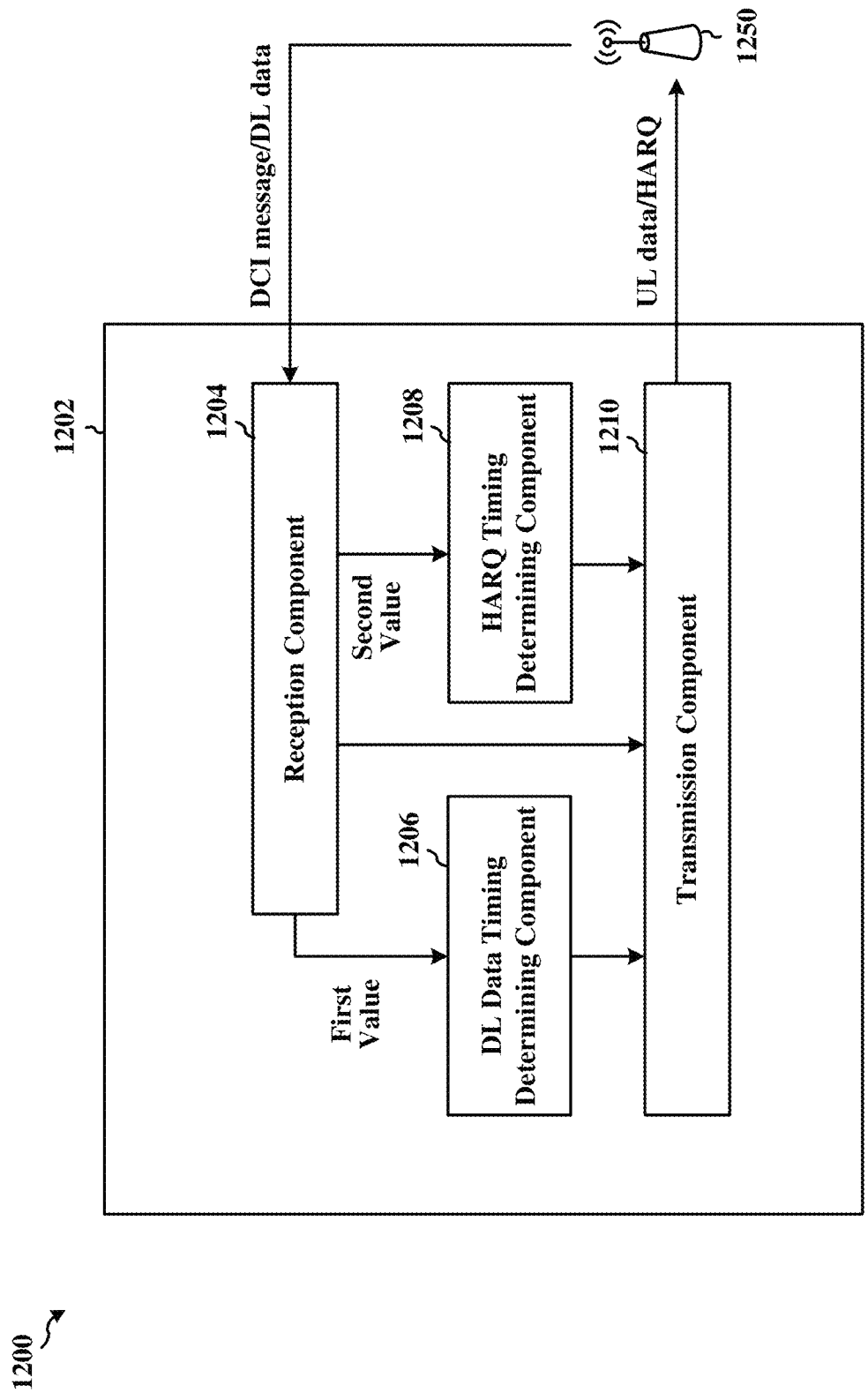
FIG. 12 shows a conceptual data flow diagram illustrating the data flow between different means/components in an example apparatus.

FIG. 12 is a conceptual data flow diagram 1200 illustrating the data flow between different means/components in an example apparatus 1202. The apparatus 1202 may be a UE. The apparatus includes a reception component 1204 that receives a single DCI message identifying a plurality of SPS configurations to be jointly activated or released, a DL data timing determining component 1206 that determines a number of time slots between an end of the received DCI message and a beginning of one or more DL data frames for each SPS configuration based on a first value carried in the DCI message, and a HARQ timing determining component 1208 that determines a number of time slots between an end of the one or more DL data frames and an instance in time at which the UE is to transmit a HARQ-ACK based on a second value carried in the DCI message.

The apparatus may include additional components that perform each of the blocks of the algorithm in the aforementioned flowcharts of FIGS. 8-11. As such, each block in the aforementioned flowcharts of FIGS. 8-11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
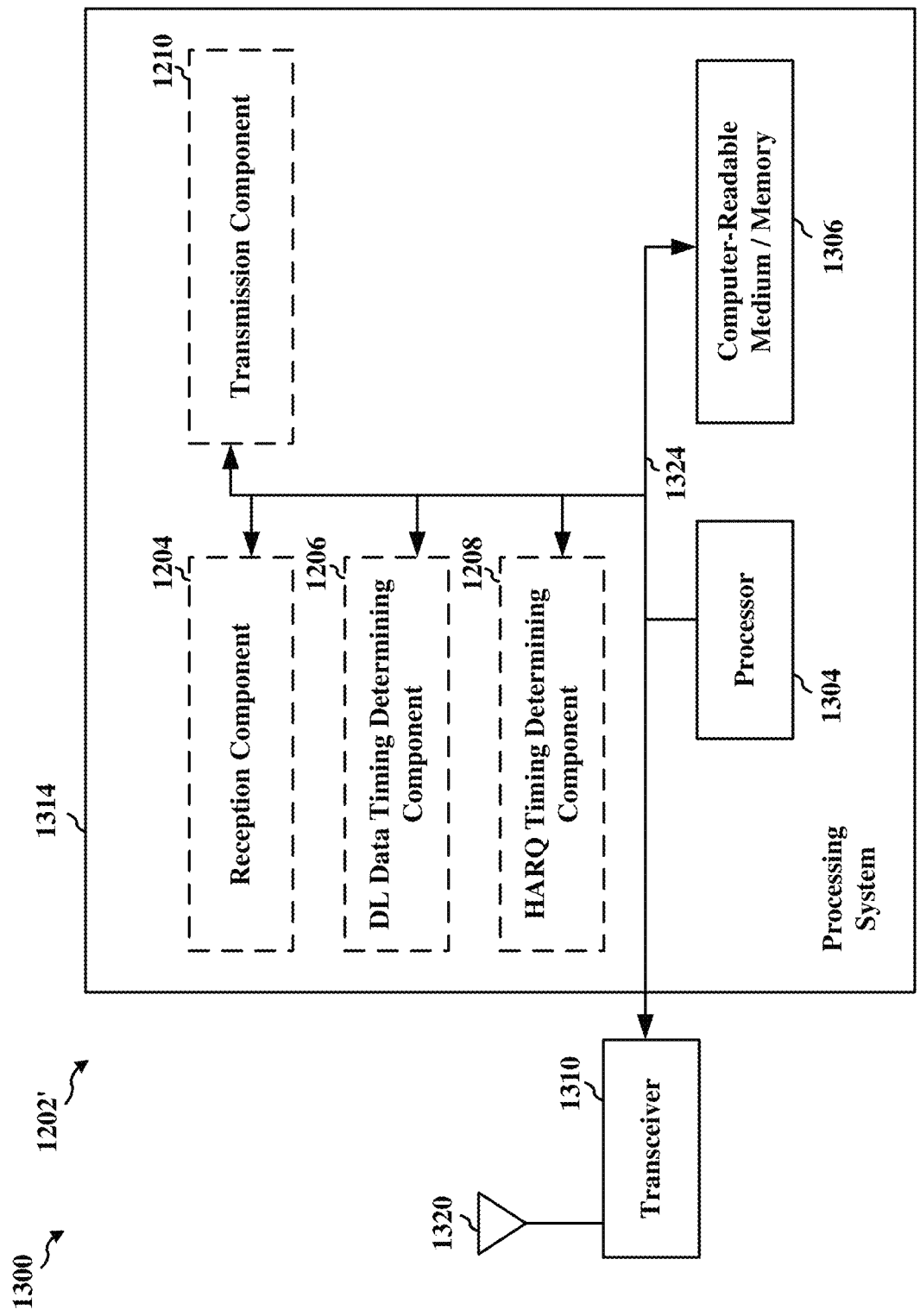
FIG. 13 shows a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, and 1208, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1210, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, and 1208. The components may be software components running in the processor 1304, resident/stored in the computer readable medium/memory 1306, one or more hardware components coupled to the processor 1304, or some combination thereof. The processing system 1314 may be a component of the UE 350 and may include the memory 360 and/or at least one of the TX processor 368, the RX processor 356, and the controller/processor 359.

In one configuration, the apparatus 1202/1202' for wireless communication includes means for receiving a single downlink control information (DCI) message identifying a plurality of semi-persistent scheduling (SPS) configurations to be jointly activated or released, means for determining a number of time slots between an end of the received DCI message and a beginning of one or more downlink (DL) data frames for each SPS configuration based on a first value carried in the DCI message, and means for determining a number of time slots between an end of the one or more DL data frames and an instance in time at which the UE is to transmit a HARQ-ACK for each SPS configuration based on a second value carried in the DCI message. The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

As described herein, aspects of the present disclosure may allow a single DCI message to jointly activate and/or jointly release multiple downlink SPS configurations and multiple Type 2 uplink CG configurations. In some implementations, different SPS and/or CG configurations associated with a UE may be divided or otherwise grouped into different sets, and a bit sequence in a single DCI message can be used to indicate multiple SPS configurations and/or multiple CG configurations that are to be jointly activated and/or released. Additionally, or alternatively, the bit sequence may include a bitmap in which each individual bit corresponds to a particular set, which can be used to indicate multiple sets that are to be jointly activated and/or released. By jointly activating and/or jointly releasing multiple downlink SPS configurations and multiple uplink CG configurations using a single DCI message, various aspects of the present disclosure may conserve network resources, base station resources, and UE resources relative to current approaches that use multiple DCI messages to separately activate and/or release the multiple downlink SPS configurations and multiple uplink CG configurations.

Implementations of the subject matter disclosed herein may also allow the same DCI message that jointly activates multiple downlink SPS configurations and/or multiple Type 2 uplink CG configurations to indicate at least some of the transmission parameters for each of the activated downlink SPS configurations and/or uplink CG configurations, without increasing the size or length of the DCI message. In accordance with some aspects of the present disclosure, when a single DCI message activates a plurality of different SPS configurations, the K0 and K1 values for the SPS configurations may be RRC configured and provided to a UE via DCI messages.

In some implementations, the UE may apply the K1 value to all SPS configurations activated by a DCI message, for example, such that the instance in time at which the UE is to transmit HARQ feedback information for each SPS configuration is based on the time at which the UE received the last symbol of DL data associated with the corresponding SPS configuration. For such implementations, the UE may transmit HARQ feedback information for each activated SPS configuration at different times using different PUCCH resources, for example, as discussed with respect to FIG. 5. In other implementations, the UE may apply the K1 value to a selected SPS configuration of the activated SPS configurations to determine the instance in time at which the UE is to transmit HARQ feedback information for the selected SPS configuration, and may transmit HARQ feedback information for the other (non-selected) SPS configurations at the same determined instance in time. For such implementations, the UE may transmit HARQ feedback information for each activated SPS configuration at the same time using the same PUCCH resources, for example, as discussed with respect to FIG. 6.

By providing at least some transmission parameters for downlink SPS configurations and/or uplink CG configurations in the same DCI message that jointly activates and/or jointly releases the downlink SPS configurations and/or uplink CG configurations, various aspects of the present disclosure may conserve network resources, base station resources, and UE resources, for example, as compared to alternate solutions that may separately transmit a set of transmission parameters for each of the jointly activated downlink SPS configurations and/or uplink CG configurations. In some implementations, the K0 and K1 values may be carried in an existing field (e.g., a HARQ process number) of the DCI message, thereby avoiding a need to introduce a new DCI field that would increase the size or length of the DCI message.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication performed by a user equipment (UE), comprising:
   receiving a single downlink control information (DCI) message identifying a plurality of semi-persistent scheduling (SPS) configurations to be jointly activated or released;
   determining, for each SPS configuration of the plurality of SPS configurations, a number of time slots between an end of the received DCI message and a beginning of one or more downlink (DL) data frames based on a first value carried in the DCI message;
   determining, for each SPS configuration of the plurality of SPS configurations, a number of time slots between an end of the one or more DL data frames and an instance in time at which the UE is to transmit a hybrid automatic repeat request acknowledgement (HARQ-ACK) based on a second value carried in the DCI message, the end of the one or more DL data frames corresponding to an end of a physical downlink shared channel (PDSCH) reception occasion, the determined instance in time corresponding to a start of a physical uplink control channel (PUCCH) resource;
   determining a time difference between the end of the PDSCH reception occasion and the start of the PUCCH resource; and
   performing an operation associated with a plurality of HARQ-ACKs corresponding to the plurality of SPS configurations based on a comparison of the time difference and a value.

2. The method of claim 1, wherein the first and second values are configured by a radio resource controller (RRC).

3. The method of claim 1, wherein the end of the received DCI message corresponds to an end of a physical downlink control channel (PDCCH) reception occasion, and the beginning of the one or more DL data frames corresponds to a start of the PDSCH reception occasion.

4. The method of claim 1, further comprising:
multiplexing the plurality of HARQ-ACKs corresponding to the plurality of SPS configurations with one or more codebooks based on the time difference being less than the value; and
transmitting the multiplexed plurality of HARQ-ACKs and codebooks on the PUCCH resource, concurrently.

5. The method of claim 4, further comprising:
transmitting the plurality of HARQ-ACKs corresponding to the plurality of SPS configurations on the PUCCH at the determined instances in time based on the time difference being greater than or equal to the value.

6. The method of claim 1, further comprising:
refraining from transmitting the plurality of HARQ-ACKs on the PUCCH resource based on the time difference being less than the value.

7. The method of claim 1, wherein the second value is based on a PDSCH-to-HARQ feedback timer.

8. The method of claim 1, wherein the second value indicates different PUCCH transmission occasions for at least two SPS configurations of the plurality of SPS configurations.

9. The method of claim 1, wherein the second value identifies a slot or subframe in the PUCCH resource for transmission of the HARQ-ACK from each SPS configuration of the plurality of SPS configurations.

10. The method of claim 1, wherein the second value indicates a same PUCCH transmission occasion for each SPS configuration of the plurality of SPS configurations.

11. The method of claim 1, wherein the DCI message further indicates at least one of a frequency domain resource assignment (FDRA), a time domain resource assignment (TDRA), or a modulation and coding scheme (MCS) common to each SPS configuration of the plurality of SPS configurations.

12. The method of claim 1, further comprising:
receiving, from a radio resource controller (RRC), at least one of a frequency domain resource assignment (FDRA), a time domain resource assignment (TDRA), a modulation and coding scheme (MCS), or a periodicity for each SPS configuration of the plurality of SPS configurations.

13. The method of claim 1, further comprising:
receiving the one or more DL data frames associated with at least one SPS configuration of the plurality of SPS configurations; and
transmitting the HARQ-ACK for the at least one SPS configuration of the plurality of SPS configurations on a PUCCH at the determined instance in time.

14. The method of claim 1, wherein the DCI message further indicates an activation or release of a plurality of configured grant configurations, and includes at least one of a frequency domain resource assignment (FDRA), a time domain resource assignment (TDRA), or a modulation and coding scheme (MCS) that is common to each configured grant configuration of the plurality of configured grant configurations.

15. A wireless communication device at a user equipment (UE) comprising:
at least one modem;
at least one processor communicatively coupled with the at least one modem; and
at least one memory communicatively coupled with the at least one processor and storing instructions that, when executed by the at least one processor in conjunction with the at least one modem, causes the wireless communication device to perform operations comprising:
receiving a single downlink control information (DCI) message identifying a plurality of semi-persistent scheduling (SPS) configurations to be jointly activated or released;
determining, for each SPS configuration of the plurality of SPS configurations, a number of time slots between an end of the received DCI message and a beginning of one or more downlink (DL) data frames based on a first value carried in the DCI message;
determining, for each SPS configuration of the plurality of SPS configurations, a number of time slots between an end of the one or more DL data frames and an instance in time at which the UE is to transmit a hybrid automatic repeat request acknowledgement (HARQ-ACK) based on a second value carried in the DCI message, the end of the one or more DL data frames corresponding to an end of a physical downlink shared channel (PDSCH) reception occasion, the determined instance in time corresponding to a start of a physical uplink control channel (PUCCH) resource;
determining a time difference between the end of the PDSCH reception occasion and the start of the PUCCH resource; and
performing an operation associated with a plurality of HARQ-ACKs corresponding to the plurality of SPS configurations based on a comparison of the time difference and a value.

16. The wireless communication device of claim 15, wherein the first and second values are configured by a radio resource controller (RRC).

17. The wireless communication device of claim 15, wherein the end of the received DCI message corresponds to an end of a physical downlink control channel (PDCCH) reception occasion, and the beginning of the one or more DL data frames corresponds to a start of the PDSCH reception occasion.

18. The wireless communication device of claim 15, wherein execution of the instructions causes the wireless communication device to perform operations further comprising:
multiplexing the plurality of HARQ-ACKs corresponding to the plurality of SPS configurations with one or more codebooks based on the time difference being less than the value; and
transmitting the multiplexed plurality of HARQ-ACKs and codebooks on the PUCCH resource, concurrently.

19. The wireless communication device of claim 18, wherein execution of the instructions causes the wireless communication device to perform operations further comprising:
transmitting the plurality of HARQ-ACKs corresponding to the plurality of SPS configurations on the PUCCH at the determined instances in time based on the time difference being greater than or equal to the value.

20. The wireless communication device of claim 15, wherein execution of the instructions causes the wireless communication device to perform operations further comprising:
refraining from transmitting the plurality of HARQ-ACKs on the PUCCH resource based on the time difference being less than the value.

21. The wireless communication device of claim 15, wherein the second value is based on a PDSCH-to-HARQ feedback timer.

22. The wireless communication device of claim 15, wherein the second value indicates different PUCCH transmission occasions for at least two SPS configurations of the plurality of SPS configurations.

23. The wireless communication device of claim 15, wherein the second value identifies a slot or subframe in the PUCCH resource for transmission of the HARQ-ACK from each SPS configuration of the plurality of SPS configurations.

24. The wireless communication device of claim 15, wherein the second value indicates a same PUCCH transmission occasion for each SPS configuration of the plurality of SPS configurations.

25. The wireless communication device of claim 15, wherein the DCI message further indicates at least one of a frequency domain resource assignment (FDRA), a time domain resource assignment (TDRA), or a modulation and coding scheme (MCS) common to each SPS configuration of the plurality of SPS configurations.

26. The wireless communication device of claim 15, wherein execution of the instructions causes the wireless communication device to perform operations further comprising:

receiving, from a radio resource controller (RRC), at least one of a frequency domain resource assignment (FDRA), a time domain resource assignment (TDRA), a modulation and coding scheme (MCS), or a periodicity for each SPS configuration of the plurality of SPS configurations.

27. The wireless communication device of claim 15, wherein execution of the instructions causes the wireless communication device to perform operations further comprising:

receiving the one or more DL data frames associated with at least one SPS configuration of the plurality of SPS configurations; and transmitting the HARQ-ACK for the at least one SPS configuration of the plurality of SPS configurations on a PUCCH at the determined instance in time.

28. The wireless communication device of claim 15, wherein the DCI message further indicates an activation or release of a plurality of configured grant configurations, and includes at least one of a frequency domain resource assignment (FDRA), a time domain resource assignment (TDRA), or a modulation and coding scheme (MCS) that is common to each configured grant configuration of the plurality of configured grant configurations.

* * * * *